US011553695B2

(12) United States Patent
Deliou

(10) Patent No.: US 11,553,695 B2
(45) Date of Patent: Jan. 17, 2023

(54) SINGLE OR DUAL TECHNOLOGY ANIMAL TAGS AND SYSTEM AND METHOD OF USING THE SAME

(71) Applicant: BOEHRINGER INGELHEIM ANIMAL HEALTH USA INC., Duluth, GA (US)

(72) Inventor: Pierre-Emmanuel Deliou, Sugar Hill, GA (US)

(73) Assignee: BOEHRINGER INGELHEIM VETMEDICA GMBH, Ingelheim am Rhein (DE)

(*) Notice: Subject to any disclaimer, the term of this patent is extended or adjusted under 35 U.S.C. 154(b) by 0 days.

(21) Appl. No.: 17/235,530

(22) Filed: Apr. 20, 2021

(65) Prior Publication Data
US 2021/0235670 A1 Aug. 5, 2021

Related U.S. Application Data

(63) Continuation of application No. 16/441,313, filed on Jun. 14, 2019, now Pat. No. 11,019,808, which is a
(Continued)

(51) Int. Cl.
A01K 29/00 (2006.01)
G06K 19/077 (2006.01)
(Continued)

(52) U.S. Cl.
CPC .......... *A01K 29/005* (2013.01); *A01K 11/004* (2013.01); *A01K 11/008* (2013.01);
(Continued)

(58) Field of Classification Search
CPC .. A01K 29/005; A01K 11/004; A01K 11/008; A01K 11/001; A01K 11/007;
(Continued)

(56) References Cited

U.S. PATENT DOCUMENTS 6,283,065 B1  9/2001  Shorrock et al.
6,342,839 B1  1/2002  Curkendall et al.
(Continued)

FOREIGN PATENT DOCUMENTS

AU    2012268831 A1    7/2013
CA       2836178 A1    6/2015
(Continued)

OTHER PUBLICATIONS

L. T. Beng, et al., "Field testing of IoT devices for livestock monitoring using Wireless Sensor Network, near field communication and Wireless Power Transfer," 2016 IEEE Conference on Technologies for Sustainability (SusTech), 2016, pp. 169-173, doi: 10.1109/SusTech.2016.7897161. (Year: 2016).*
(Continued)

*Primary Examiner* — Matthew Mikels
(74) *Attorney, Agent, or Firm* — John Esteban Ezcurra

(57) ABSTRACT

A system and method are disclosed for tracking animals, which may include production animals as well as pets. The system and method may comprise a tag system that is attached to an animal that generally has at least a near-field-communication (NFC) tag. The tag system comprises at least an NFC tag and a radio-frequency identification (RFID) tag. For NFC tags, such tags may be read with a portable computing device, such as a mobile telephone running NFC reader application software. The phone may communicate with a communications network and ultimately a computer server in order to relay information received from a respective electronic tag. The electronic tags may be fastened, embedded, or ingested by an animal. The electronic tags may be part of a mechanical coupling. Each mechanical coupling may comprise a different structure depending on the whether the tags are fastened to, embedded in, or ingested by the animal.

20 Claims, 19 Drawing Sheets

Related U.S. Application Data continuation of application No. 15/474,300, filed on Mar. 30, 2017, now Pat. No. 10,342,219.

(60) Provisional application No. 62/316,204, filed on Mar. 31, 2016.

(51) Int. Cl.
| | | |
|---|---|---|
| *H01Q 5/30* | (2015.01) | |
| *A01K 11/00* | (2006.01) | |
| *G06K 7/10* | (2006.01) | |
| *H01Q 1/22* | (2006.01) | |

(52) U.S. Cl.
CPC ... *G06K 7/10297* (2013.01); *G06K 19/07749* (2013.01); *G06K 19/07758* (2013.01); *G06K 19/07773* (2013.01); *H01Q 1/2225* (2013.01); *H01Q 5/30* (2015.01)

(58) Field of Classification Search
CPC ......... G06K 7/10297; G06K 19/07749; G06K 19/07758; G06K 19/07773; H01Q 1/2225; H01Q 5/30
See application file for complete search history.

(56) References Cited

U.S. PATENT DOCUMENTS

| | | | |
|---|---|---|---|
| 6,539,281 | B2 | 3/2003 | Wan et al. |
| 7,299,990 | B2 | 11/2007 | Hoshina |
| 7,460,018 | B2 | 12/2008 | Kubo |
| 7,589,638 | B2 | 9/2009 | Jackson et al. |
| 3,031,067 | A1 | 10/2011 | Greenberg |
| 8,368,515 | B2 | 2/2013 | Kim |
| 8,560,349 | B2 | 10/2013 | Coe |
| 8,905,317 | B1 | 12/2014 | Hsu |
| 9,298,756 | B1 | 3/2016 | Johnson |
| 9,560,482 | B1 | 1/2017 | Frenz |
| 9,693,536 | B1 | 7/2017 | Dana |
| 2002/0158765 | A1 | 10/2002 | Pape et al. |
| 2004/0236191 | A1 | 11/2004 | Poliska et al. |
| 2005/0190038 | A1 | 9/2005 | Parthoens |
| 2006/0202835 | A1 | 9/2006 | Thibault |
| 2006/0270421 | A1 | 11/2006 | Phillips et al. |
| 2008/0040157 | A1 | 2/2008 | Saunders |
| 2011/0234399 | A1 | 9/2011 | Yan |
| 2012/0124387 | A1 | 5/2012 | Scocik |
| 2012/0231816 | A1 | 9/2012 | Kubo |
| 2013/0157628 | A1 | 6/2013 | Kim et al. |
| 2014/0113549 | A1 | 4/2014 | Beg |
| 2014/0306005 | A1 | 10/2014 | Kline |
| 2014/0370909 | A1 | 12/2014 | Natucci, Jr. et al. |
| 2015/0053773 | A1 | 2/2015 | Hsu et al. |
| 2015/0334994 | A1 | 11/2015 | Prasad |
| 2015/0339501 | A1 | 11/2015 | Auer |
| 2016/0027022 | A1 | 1/2016 | Benoit et al. |
| 2016/0063188 | A1 | 3/2016 | Thornberry et al. |
| 2016/0116596 | A1 | 4/2016 | Rajala |
| 2016/0135431 | A1* | 5/2016 | Sheldon .................. H02J 7/025 |
| | | | 119/859 |
| 2016/0142872 | A1 | 5/2016 | Nicholson et al. |

FOREIGN PATENT DOCUMENTS

| | | | |
|---|---|---|---|
| EP | 2465344 | A1 | 6/2012 |
| ES | 2558790 | A1 | 2/2016 |
| JP | H0672352 | U | 10/1994 |
| JP | 2006209497 | A | 8/2006 |
| JP | 2007094875 | A | 4/2007 |
| JP | 2013117905 | A | 6/2013 |
| WO | 2006/091765 | A2 | 8/2006 |
| WO | 2010/016772 | A1 | 2/2010 |
| WO | 2011129840 | A1 | 10/2011 |
| WO | 2012006331 | A1 | 1/2012 |
| WO | 2012086412 | A1 | 6/2012 |
| WO | 2016109835 | A1 | 7/2016 |
| WO | 2016189524 | A9 | 12/2016 |

OTHER PUBLICATIONS

Kang, Byeongbeom, and Hyun Yoe. "NFC based Livestock Traceability Management System." Advanced Science and Technology Letters 51 (2014): 329-336.
Koo, Jee-Hee, et al. "Development of the RFID-based Livestock ID Management System." Journal of Next Generation Information Technology 4.5 (2013): 147.
Voulodimos, Athanasios S., et al. "A complete farm management system based on animal identification using RFID technology." Computers and electronics in agriculture 70.2 (2010): 380-388.
"NXPRFID-Livestock Management RFID | Livestock Industry Solutions" web page downloaded from https://nxprfid.com/applications/livestockmanagement/ on Oct. 26, 2016.
"QR Code Pet ID Tags by BARKCODE—BARKCODE Dog Collars and Pet ID Tags," (https://shopbarkcode.com/collections/barkcode-pet-id-tag-retail?from=barkcode.com and https://shopbarkcode.com/pages/sample-dprofile); accessed Sep. 6, 2017.
"Smart Pet Collar—MDT Innovations Sdn. Bhd," (http://mmdt.cc/iot-solutions-mdt/smart-pet-collar/), accessed Sep. 6, 2017.
"SureFlap RFID Collar Tab," web page downloaded from http://petdoorsrus.co.nz/SureFlapRFIDCollarTag on Dec. 19, 2016.
T Berners-Lee et al: "RFC 3986—Uniform Resource Identifier (URI): Generic Syntax", Jan. 31, 2005 (Jan. 31, 2005), XP055228543, Retrieved from the Internet: URL:https://tools.ietf.org/html/rfc3986 [retrieved on Nov. 16, 2015].

* cited by examiner

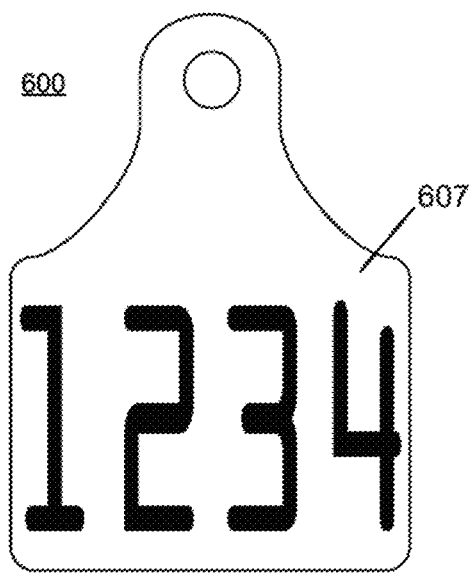
FIG. 6A
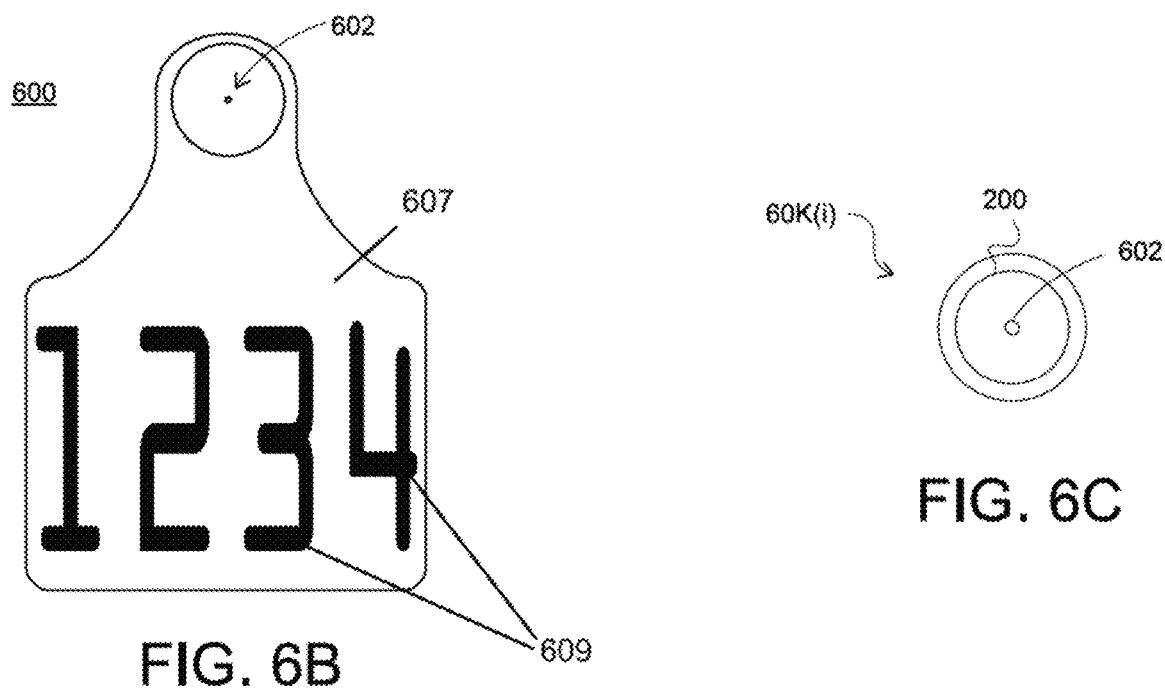
FIG. 6B
FIG. 6C

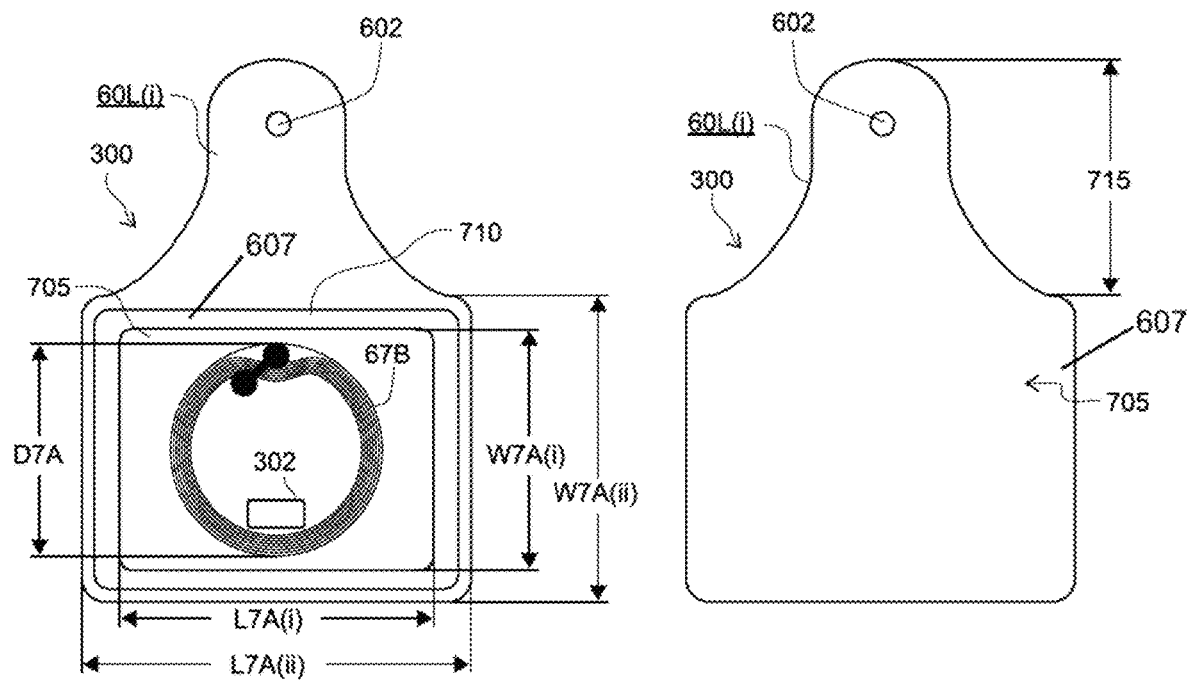
FIG. 7A-2
FIG. 7A-3
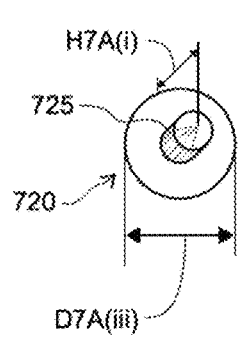
FIG. 7A-4
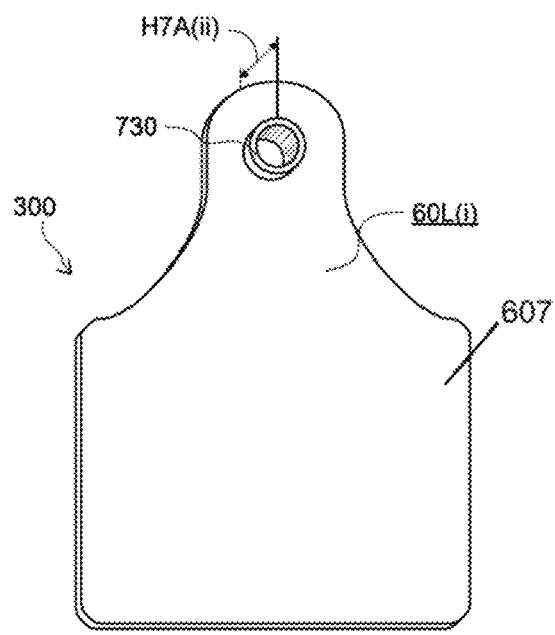
FIG. 7A-5

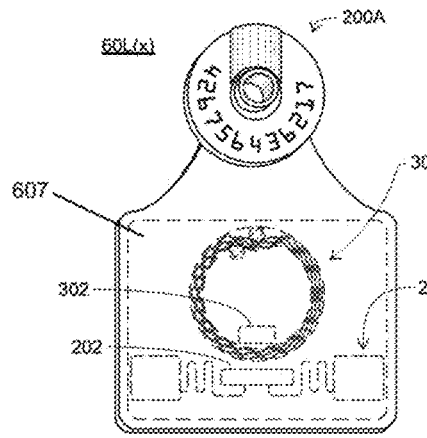 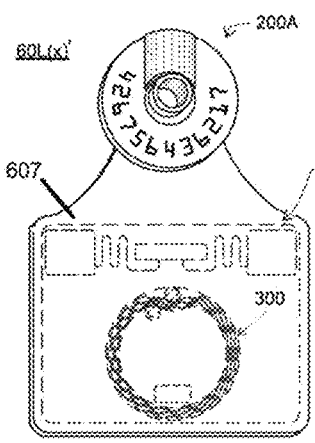 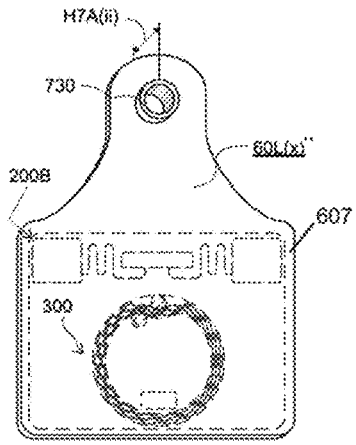
FIG. 8H-1    FIG. 8H-2    FIG. 8H-3
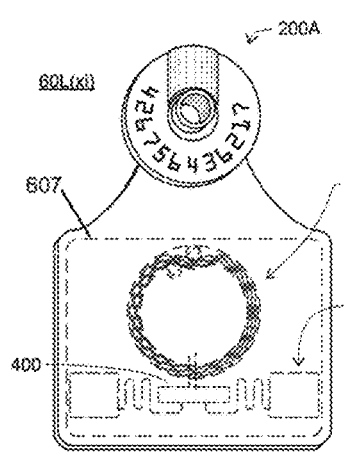 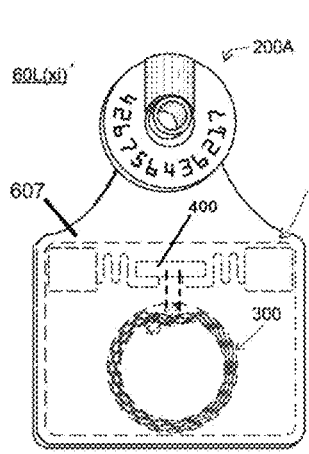 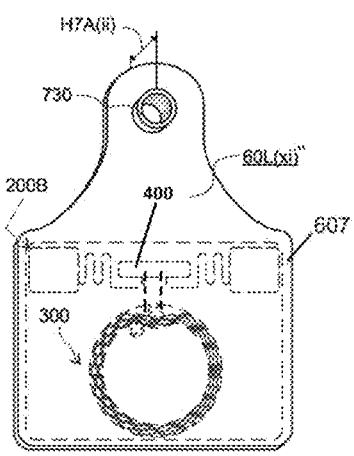
FIG. 8I-1    FIG. 8I-2    FIG. 8I-3

SINGLE OR DUAL TECHNOLOGY ANIMAL TAGS AND SYSTEM AND METHOD OF USING THE SAME

PRIORITY AND RELATED APPLICATIONS STATEMENT

This patent application is a continuation of U.S. patent application Ser. No. 16/441,313 filed on Jun. 14, 2019, now U.S. Pat. No. 11,019,808, which is a continuation of U.S. patent application Ser. No. 15/474,300 filed on Mar. 30, 2017, now U.S. Pat. No. 10,342,219, which claims priority under 35 U.S.C. § 119(e) to U.S. Provisional Patent Application Ser. No. 62/316,204, filed on Mar. 31, 2016, entitled, "SINGLE OR DUAL TECHNOLOGY ANIMAL TAGS AND SYSTEM AND METHOD OF USING THE SAME," the entire contents of which are hereby incorporated by reference.

BACKGROUND OF THE INVENTION

Presently, Radio Frequency Identification (RFID) "microchips" are used for identifying animals, including production and domestic animals and wildlife, for various reasons. Such RFID microchips are used in such varied circumstances as recording production animal movements and handling, lost domestic animal identification, and wildlife "banding" for research purposes. The RFID microchips sometimes suffer from various disadvantages, including availability, power and portability limitations of specifically designed RFID readers, and limited information available through the RFID microchip. Moreover, competing microchip manufacturers may maintain separate databases, and microchips of those manufacturers may use different types of RFID readers that may only read the microchip of that manufacturer.

Further, RFID microchips in animal tags are often not compatible with portable computing devices, such as mobile telephones. That is, most mobile telephones are not equipped with either hardware or software or both that would allow for communications between a mobile telephone and an RFID microchip in an animal tag.

Accordingly, there is a need in the art for animal tags that may support communications with portable computing devices, such as a mobile telephone.

Citation or identification of any document in this application is not an admission that such document is available as prior art to the present invention.

SUMMARY OF THE INVENTION

A system and method are disclosed for tracking domesticated and wild animals, including, but is not limited to, production animals (e.g. cattle, pigs, sheep, etc.), companion animals (e.g. dogs, cats and horses), poultry and fish, among others. The system and method may comprise a tag system that is attached to an animal that generally has at least a near-field-communication (NFC) tag. In some exemplary embodiments, the tag system comprises at least an NFC tag and a radio-frequency identification (RFID) tag.

For NFC tags, such tags may be read with a portable computing device, such as a mobile telephone running NFC reader application software. The mobile telephone may communicate with a communications network and ultimately one or more computer servers in order to relay information received from a respective electronic tag.

The electronic tags may be fastened to, embedded in, or ingested by an animal. The electronic tags may be part of a mechanical coupling. That mechanical coupling may take on different structures depending on the whether the tags are fastened to, embedded in, or ingested by the animal. When fastened to an animal, the mechanical coupling may comprise an ear tag, a strap, a band, a collar, a bridle, or a harness. When embedded or ingested by an animal, the mechanical coupling may comprise a very small container, such as, but not limited to, a glass vile or vile made from some biocompatible material.

Each electronic tag may comprise a computer chip (i.e. —a system-on-chip—SOC) which includes some form of tuning circuitry, a processor, a memory, and an antenna. In some exemplary embodiments, electronic tags may share antennas, computer chips, and support substrates. Each electronic tag may be powered from interrogation signals which may be used to "read" any information stored in memory that is part of a respective electronic tag.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

This summary is provided to introduce a selection of concepts that are further described below in the detailed description. This summary is not intended to identify key or essential features of the claimed subject matter, nor is it intended to be used as an aid in limiting the scope of the claimed subject matter.

These and other embodiments are disclosed or are obvious from and encompassed by, the following Detailed Description.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 3A-1 illustrates one exemplary embodiment of a single encasement for an implantable or ingestible NFC tag and RFID tag having separate chips and separate antennas according to principles of the present invention.

FIG. 3B-1 illustrates one exemplary embodiment of a single encasement for an implantable or ingestible NFC and RFID tag combination which has a common chip but separate antennas according to principles of the present invention.

FIG. 3C-1 illustrates one exemplary embodiment of a single encasement 60 for implantable or ingestible NFC and RFID tags having a common chip and common antenna for both tag functions.

FIG. 3A-2 illustrates one exemplary embodiment of a single encasement for implantable or an ingestible NFC tag and RFID 200 with separate chips and separate antennas following the exemplary embodiment illustrated in FIG. 3A-1.

FIG. 3B-2 this figure illustrates one exemplary embodiment of a single encasement for an implantable or ingestible NFC tag and RFID tag with a common chip 400 and separate antennas following the exemplary embodiment illustrated in FIG. 3B-1.

FIG. 3C-2(*i*) illustrates one exemplary embodiment of a single encasement for an implantable or ingestible NFC tag and RFID tag with a common chip and a single, common antenna for both tags following the exemplary embodiment illustrated in FIG. 3C-1.

FIG. 3C-2(*ii*) illustrates one exemplary embodiment of a single encasement for an implantable or ingestible NFC tag and RFID tag having a common chip and a single antenna for both tags following the exemplary embodiment illustrated in FIG. 3C-1.

FIG. 6A illustrates an exemplary embodiment of an animal ear tag.

FIG. 6B illustrates an exemplary embodiment of an RFID tag that is to be positioned at a rivet point of the ear tag of FIG. 6A.

FIG. 6C illustrates an exemplary embodiment of an RFID tag having a button type structure that may function as a fastener and couple to rivet point of a tag, such as illustrated in FIG. 6B.

FIG. 7A-1 illustrates an exemplary embodiment of an NFC tag within an ear tag, similar to the plain tag of FIG. 6A but with an antenna in a rectangular portion of the tag.

FIG. 7A-2 illustrates an exemplary embodiment of a rear view of the NFC tag illustrated in FIG. 7A-1 but with a cut-away view.

FIG. 7A-3 illustrates a plain, rear view of the exemplary embodiment of the NFC tag illustrated in FIG. 7A-1.

FIG. 7A-4 illustrates a perspective view of a button structure that may be used at rivet point for the exemplary embodiments of FIG. 7A to fasten the tag structure to an animal.

FIG. 7A-5 illustrates a front perspective view of the exemplary embodiment of the NFC tag illustrated in FIG. 7A-1.

FIG. 7B-1 illustrates an exemplary embodiment of an NFC tag within an ear tag, similar to the plain tag 600 of FIG. 6A, but with an antenna near a rivet point for the tag.

FIG. 7B-2 illustrates further details of the integral tag structure of FIG. 7B-1.

FIG. 7C-1 illustrates a button type structure 60L similar to the exemplary embodiment of FIG. 6C and the exemplary embodiment of FIG. 7B where the circular/ring portion may comprise an antenna for an NFC tag according to an exemplary embodiment.

FIG. 7C-2 illustrates a cut-away view of the button type tag structure illustrated in FIG. 7C-1.

FIG. 8B-1 illustrates an opposite embodiment relative to FIG. 8A in which an NFC tag may be positioned in the flat/rectangular part while the RFID tag is included in the circular part functioning as the rivet receptacle for the tag structure.

FIG. 8B-2 illustrates details of the NFC antenna and its corresponding NFC chip of FIG. 8B-1 are visible in this cut-away view.

FIG. 8H-1 illustrates an exemplary embodiment of a triple mode tag in which a first RFID tag forms a receptacle for receiving a fastener and a second RFID tag that is formed in a rectangular portion of the structure along with an NFC tag that is also formed in the rectangular portion of the structure.

FIG. 8H-2 illustrates an exemplary embodiment of a triple mode tag in which a first RFID tag forms a receptacle for receiving a fastener and a second RFID tag that is formed in a rectangular portion of the structure along with an NFC tag that is also formed in the rectangular portion of the structure.

FIG. 8H-3 illustrates an exemplary embodiment of a dual mode tag in which the RFID tag is formed in a rectangular portion of the structure along with an NFC tag that is also formed in the rectangular portion of the structure.

FIG. 8I-1 illustrates an exemplary embodiment of a triple mode tag in which a first RFID tag forms a receptacle for receiving a fastener and a second RFID tag that is formed in a rectangular portion of the structure along with an NFC tag that is also formed in the rectangular portion of the structure, where the second RFID tag and NFC tag share the same electronic chip for their respective tuning circuitry.

FIG. 8I-2 illustrates an exemplary embodiment of a triple mode tag in which a first RFID tag forms a receptacle for receiving a fastener and a second RFID tag that is formed in a rectangular portion of the structure along with an NFC tag that is also formed in the rectangular portion of the structure, where the second RFID tag and NFC tag share the same electronic chip for their respective tuning circuitry.

FIG. 8I-3 illustrates an exemplary embodiment of a dual mode tag in which an RFID tag is formed in a rectangular portion of the structure along with an NFC tag that is also formed in the rectangular portion of the structure, where the second RFID tag and NFC tag share the same electronic chip for their respective tuning circuitry.

DETAILED DESCRIPTION

Reference will now be made in detail to embodiments of the Single or Dual Technology Animal Tags and System and Method of Using the Same with reference to the accompanying figures, in which like reference numbers indicate like elements.

Figure 1:
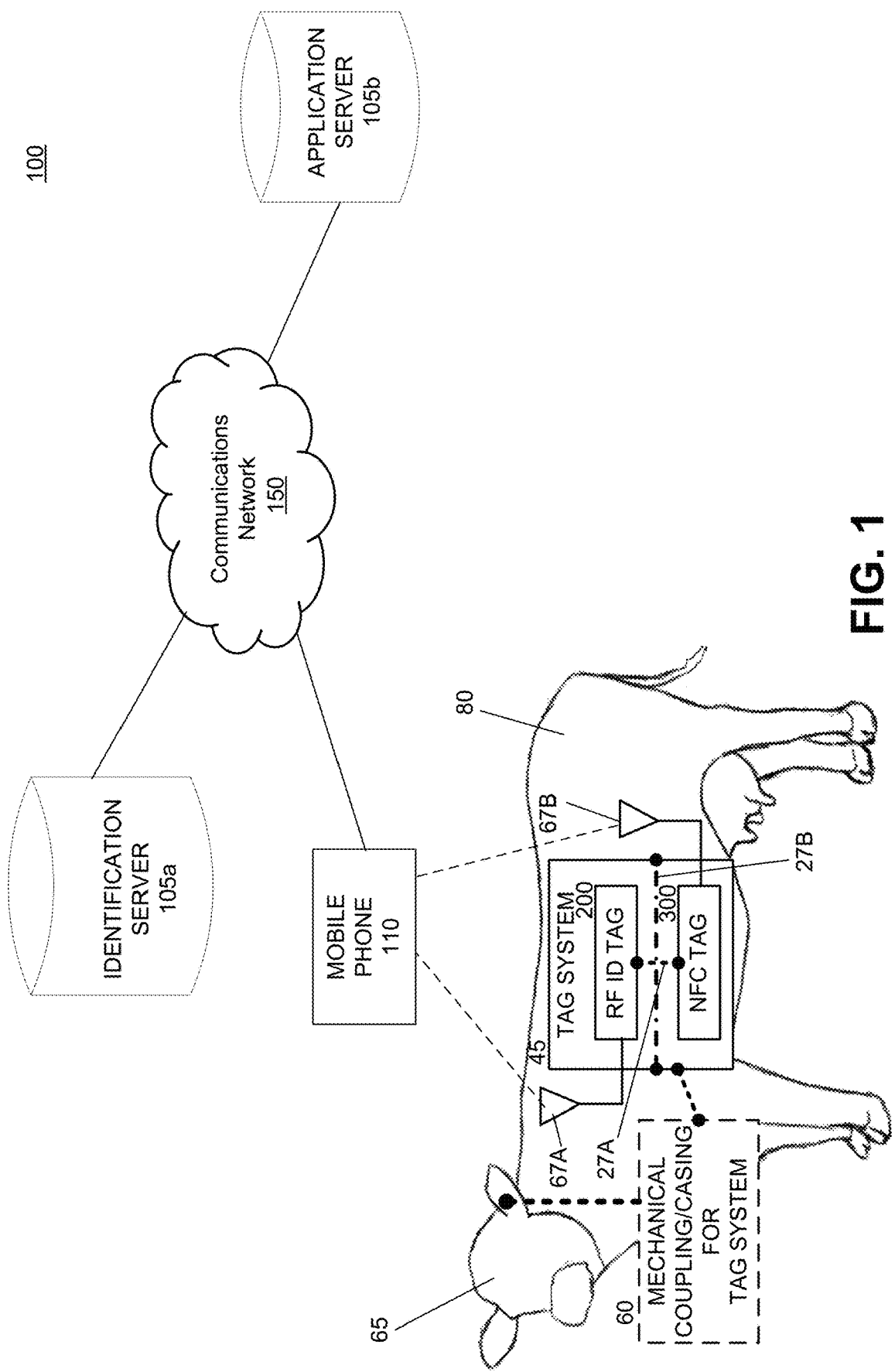
FIG. 1 illustrates one exemplary embodiment of a system according to principles of the present invention.

Referring now to FIG. 1, this figure illustrates one exemplary embodiment of a system 100 according to principles of the present invention. The system 100 may comprise an identification computer server 105a, an application computer server 105b, a mobile phone 110, and a communications network 150. The servers 105a-b and client device/mobile phone 110 may all be coupled together via a computer communications network 150. The computer communications network 150 may comprise a wide area network ("WAN"), the plain-old-telephone-system ("POTS), a local area network ("LAN"), the Internet, or any combination of these and other types of networks. Through the network 150, the servers 105a-b and client device 110 may communicate and exchange information about the tag system 45.

The mobile phone 110 may communicate with a tag system 45 via antennas 67A, 67B of the tag system 45. The tag system 45 may include a mechanical coupling/casing 60 such that it may be physically attached to an animal 80. Specifically, the mechanical coupling/casing 60 may be coupled to the head 65 of animal 80, such as on an ear of an animal 80, like an ear of a cow 80.

The tag system 45 may comprise a radio-frequency identification (RFID) tag 200 and a near-field communication (NFC) tag 300. The RFID tag 200 may have its own antenna 67A while the NFC tag 300 may have its own antenna 67B. Either or both tags 200, 300 may communicate with the portable computing device 110, which may comprise a mobile phone 110 as will be described in detail below.

The RFID tag 200 may be electrically coupled to and may communicate directly with the NFC tag 300 and vice-versa as indicated by dashed line 27A. Alternatively, RFID tag 200 and NFC tag 300 may not have any direct communications/communication line 27A and operate independent of one another. The RFID tag 200 may be housed/placed in the same physical housing of the NFC tag 300 or the two devices may be separate from each other as indicated by dashed line 27B. Variations of these communication schemes and housing/physical relationships between the RFID tag 200 and NFC tag 300 will be described in further detail below in connection with several views which depict the variety of exemplary embodiments.

As noted above, the system 100, as illustrated in FIG. 1, relates to tags, medallions, transponder implants, or other devices (referred to herein as "tag" or "tags" 200, 300) that include a near-field communication (NFC) device (commonly known as a "tag—300," "chip 302 [see FIG. 3A-2]" or "microchip"), as described in detail below. Each NFC tag 300 can be encoded to have a unique identification (UID) such that no two NFC tags 300 included in the system 100 will have the same identification information.

A system 100 according to the present invention may include an "identification" server 105a, which stores information about an individual NFC device 300 and corresponding information related to the identity of an animal 80 and associated with the individual NFC tag/device 300. The present invention may also include an "application" server 105b that offers users of NFC devices 300 according to the present invention access to various services that may be tailored to the type of animal 80 associated with the NFC tag 300 or categories of animals 80 or NFC tags 300. Details of these components are described in detail in the following description.

The RFID tags 200 as described herein and below usually comprise off-the-shelf components. One focus/thrust of the exemplary system 100 is how NFC tags 300, which are currently not used in animal identification industry standards, can enhance data collection with animals when coupled with RFID tags, which are currently part of most animal identification industry standards.

NFC Tag Characteristics

An NFC chip 302 may comprise a passive device that stores data. Therefore, one advantage of the NFC tag 300 or chip 302 is that the NFC tag/chip 300/302 is not battery-powered and is instead powered by being brought into proximity of a powered NFC device, such as a mobile telephone. Typically NFC tags 300 or chips 302 can store a small amount of information for transfer to another NFC device, such as a mobile phone. NFC chips are typically read-only in normal use, but may be rewritable, depending on the contemplated use of the NFC chip 302.

An NFC chip 302 can be read or communicated with according to known protocols. Current NFC readers operate within the globally available unlicensed radio frequency ISM band of about 13.56 MHz on ISO/IEC 18000-3 air interface at rates ranging from about 106.0 to about 424.0 kbit/s. The invention is not limited to operating on a particular frequency, but may be adjusted for adaptions in operating frequency of the available near field communication technology (NFC). To read an NFC chip 302, an NFC reader generally must be brought within approximately 10.0 cm or less of the of the NFC chip 302. However, other distances greater this range are possible for different frequencies and/or if the standards for NFC tags 300 should change in the future.

NFC readers may be included in a portable electronic device, such as a smartphone 110, tablet, laptop, smart watch, wearable device, or peripheral (such as a wand reader, USB reader, serial reader) or other appropriate device, to establish communication by bringing the portable electronic device within about 10.0 cm (about 4.0 inches) of each NFC tag 300. In some circumstances, the NFC tag 300 may require the reader to be brought into closer proximity depending the on the NFC tag 300 and/or reader type.

For example, using a smartphone to read a NFC tag 300 may require the smartphone 110 to be brought within about 1.0 inch of the NFC tag 300. The NFC tag and the portable electronic device can exchange information. For example, the NFC tag 300 can store information such as a universal resource locator (URL), configuration parameters, pre-programmed cryptographic key, memory blocks for use by the application to store additional cryptographic keys, which can be used as a token to sign, authenticate, unlock medical records, authentication information or the like. The particular data stored can vary depending on the memory capacity of the NFC tag 300 and may include aspects such as vaccination certificates, vaccination information (such as expiration), known medical conditions, allergy information, which may be encrypted or unencrypted, particularly when access to the information may be of a more urgent nature, such as rabies vaccination status or allergy information, or offers other benefits that would result from the information being quickly accessible.

The NFC tag 300 according to an aspect of the present invention may include an identification code, where the code can provide tag identification information. The identification is intended to be unique such that no two tags 300 included in the system 100 will have the same identification information. That is, for all intents and purposes of the system, the tag identifier is unique (UID). For example, the tag identification information may include information such as the name of the tag manufacturer and manufacture date. The NFC tag 300 can also be programmed to include other information. Usually, information is stored in the NFC tag 300 in a specific data format such as NFC Data Exchange Format (NDEF). For example, the NFC tag 300 may store a URL (web address) or a telephone number. Current NFC tags 300 typically store a URL of about 40 to about 132 characters.

The preloading of the URL address may be performed by the NFC tag manufacturer or a later party, such as a service provider, who reserves the URL address for use with the NFC tag 300 and loads the URL address information. NFC tags 300 can be locked so that once data has been written, it cannot be altered. For most NFC tags 300, this is a one way process so once the tag is locked it cannot be unlocked. Notwithstanding the foregoing description of current NFC tags 300, the principles of the present invention are not limited to embodiments using current NFC technology.

For example, most current NFC chips 302 come with a read-only factory encoded ID number on 7 bytes (56 bit) 2^56=7.2E16 combinations. IPv4's 32 bit architecture (UUID) and IPv6's 128 bit architecture (UUID), allow for further expansion of tag information. As technology advances, aspects of the present invention may be expanded. The chip 302 may be customized to have two information types—permanent information in static memory 440a and editable information in dynamic rewritable memory 440b [see FIG. 3D for memory 440].

Physical Embodiments of the NFC Tag

The physical embodiment of the NFC tag 300 may take different forms according to principles of the present invention. The form of the NFC tag 300 may be chosen to be appropriate for the type of animal and usage of the NFC tag 300. For example, the NFC tag 300 may be internal, external, affixed or mounted on a wearable device.

An NFC tag 300 that is internal would be one that is implantable, similar to some RFID tags 200 that are used for identifying pets that have been separated from their owner. In such a structure, an NFC chip 302 could be encased in an appropriate biocompatible hermetically sealed container (e.g., a glass vial) 60 [i.e. see FIGS. 2-3] or embedded in an appropriate biocompatible material and inserted subcutaneously by known methods. As discussed in detail below, an NFC tag 300 offers advantages over prior RFID tags 200 such as the ability to read the NFC tag 300 with an available computer, tablet or smartphone 110 running application software.

Figure 2A:
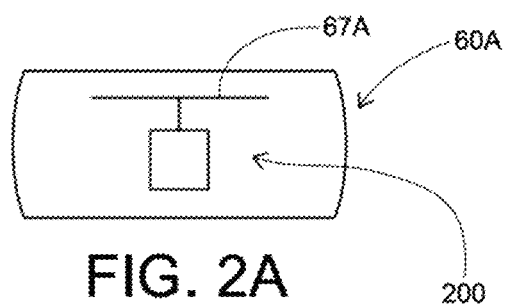
FIG. 2A illustrates one exemplary embodiment of an implantable or ingestible RFID tag according to principles of the present invention.

Referring now to FIG. 2A, this figure illustrates one exemplary embodiment of an implantable or ingestible RFID tag 200 according to principles of the present invention. The RFID tag 200 may comprise an antenna 67A that is enveloped in a container 60A.

Figure 2B:
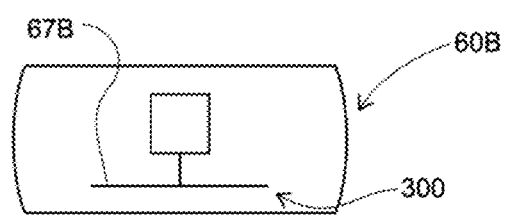
FIG. 2B illustrates one exemplary embodiment of an implantable or ingestible NFC tag according to principles of the present invention.

Referring to FIG. 2B, this figure illustrates one exemplary embodiment of an implantable or ingestible NFC tag 300 according to principles of the present invention. Like the RFID tag 200 of FIG. 2A, NFC tag 300 may comprise an antenna 67B that is enveloped in a container 60B.

The NFC tag 300 may be implanted in addition to an RFID tag 200 into a same animal 80, so that the animal 80 can be identified via the NFC tag 300 according to the present invention or via the RFID tag 200 according to known methods. The NFC tag 300 and the RFID tag 300 may be implantable using the same or separate procedures. In such circumstances, the location of the NFC implant and the RFID implant may be at commonly understood locations on the animal so that a person seeking to energize and read the appropriate tag will know where to apply the appropriate reader (NFC or RFID). For example, in cattle animal applications, tags 200, 300 are generally fastened and/or implanted in or proximate to the ear of the animal 80.

According to one aspect of the present invention, the NFC tag 300 may be included in a medium that can then be implanted under the skin of a pet, for example a hermetically sealed biocompatible container 60. For example, the NFC tag 300 may be included in a glass vial 60 and implanted in a manner similar to prior RFID tag systems, however, with the NFC tag functionality described herein.

Figures 1, 3A:
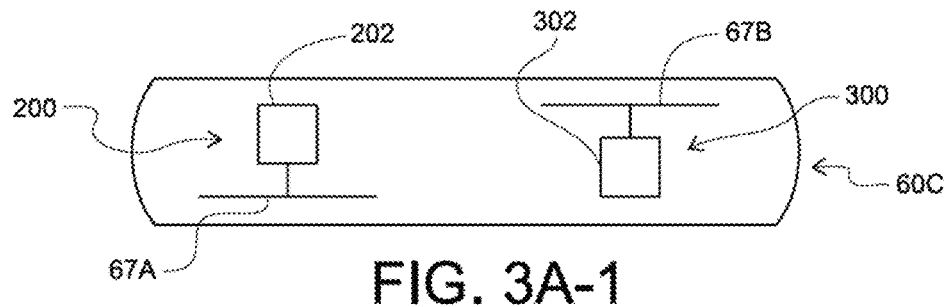

Referring now to FIG. 3A-1, this figure illustrates one exemplary embodiment of a single encasement 60C for an implantable or ingestible NFC tag 300 and RFID tag 200 having separate chips 202, 302 and separate antennas 67A, 67B according to principles of the present invention. As schematically illustrated in FIG. 3A-1, a single vial or encasement 60C could include an RFID chip 202 with its own antenna 67A for communication on an appropriate frequency for a known RFID reader and an NFC chip 302 and appropriate antenna 67B for communication on an appropriate frequency for NFC readers. Further details of this exemplary embodiment illustrated of FIG. 3A-1 are illustrated in FIG. 3A-2 described in further detail below.

Figures 1, 3B:
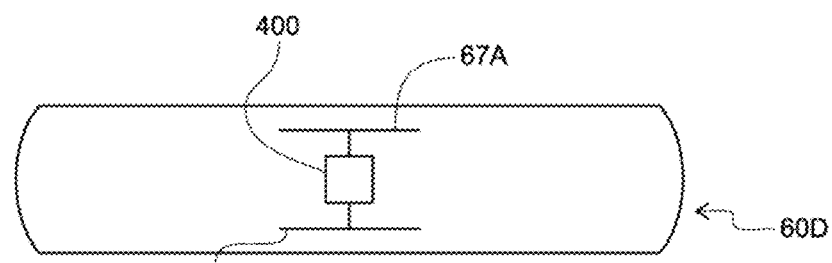

Referring now to FIG. 3B-1, this figure illustrates one exemplary embodiment of a single encasement 60D for an implantable or ingestible NFC and RFID tag combination which has a common chip 400 but separate antennas 67A, 67B according to principles of the present invention. As schematically illustrated in FIG. 3B-1, a single chip 400 may be operably connected to a first antenna 67A capable of transmitting/receiving an appropriate frequency for known RFID readers and also operably connected to second antenna 67B capable of transmitting/receiving an appropriate frequency for NFC readers. Further details of the exemplary embodiment of FIG. 3B-1 are illustrated in FIG. 3B-2 described in further detail below.

Figures 1, 3C:
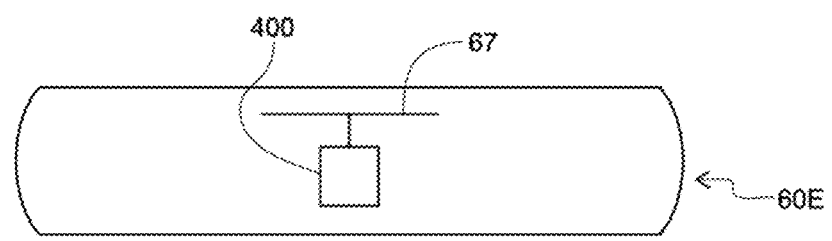

Similarly, FIG. 3C-1 illustrates one exemplary embodiment of a single encasement 60E for implantable or ingestible NFC and RFID tags having a common chip 400 and common antenna 67 for both tag functions. As schematically illustrated in FIG. 3C-1, a single "dual mode" chip 400 may be operably connected to a single antenna 67 capable of transmitting/receiving an appropriate frequency for known RFID readers and an appropriate frequency for NFC readers is included in a single vial or encasement. Further details of the exemplary embodiment of FIG. 3C-1 are illustrated in FIG. 3B-1 and FIG. 3B-2, described below.

Figures 2, 3A:
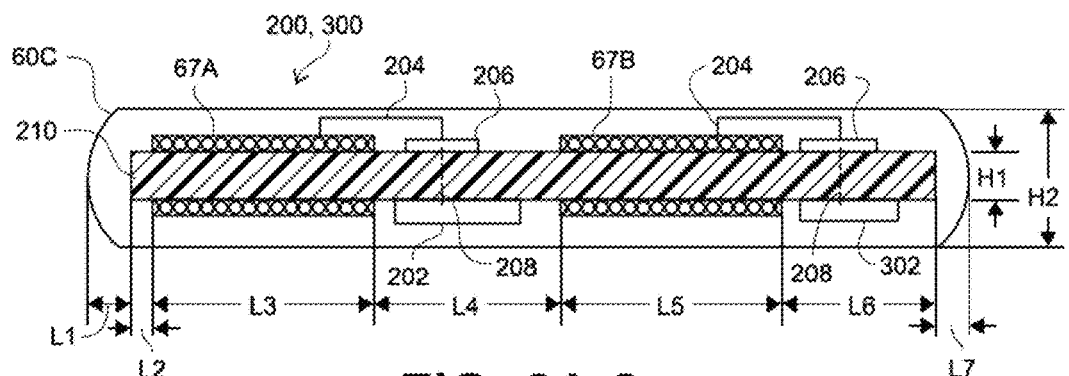
Figures 2, 3B:
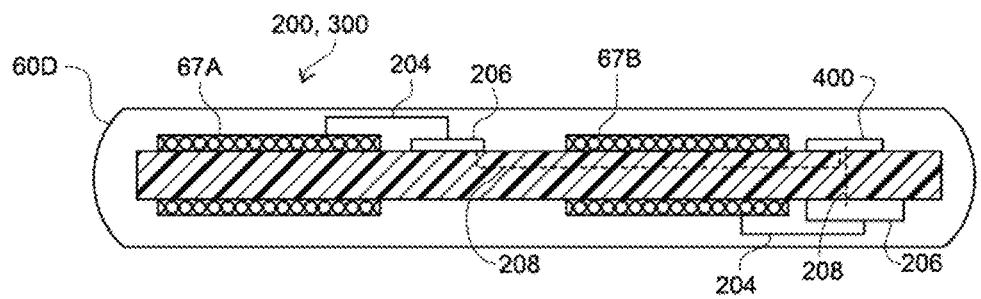

The single chip 400 of FIG. 3B-1 and FIG. 3B-2 may include standard RFID technology functionality and NFC tag functionality. That is, for example, the chip 400 may have a component/elements that can be energized by an RFID reader specific to that type of microchip and by a generic NFC reader of the type typically available with various portable electronic devices such as mobile phones 110 and tablets.

For example, when energized, the RFID tag 200 typically operates at about a 136.0 kHz frequency and is readable at approximately 3.0 feet from the chip 400 to transmit a unique identification code that can be correlated with the a user identification information to facilitate providing services to the user.

Typically, the correlation information is maintained in a database that is accessible to appropriate "readers", such as veterinarians, animal shelters, law enforcement and animal control officials. In addition, the same single chip 400 can also function according to principles of the present invention such that an NFC reader energizes the NFC tag functionality of the chip 400 to launch the URL on an Internet connected device or via an App.

In another aspect of the present invention, the tag 200, 300 may be ingestible, for use, for example, for laboratory animals. Although not shown in the present figures, an ingestible tag 200, 300 may be fabricated in a fashion similar to the implantable tag, so long as the materials used therefore are safe for ingestion, as would be appreciated by one of skill in the art.

FIG. 3A-2 illustrates one exemplary embodiment of a single encasement 60C for implantable or an ingestible NFC tag 300 and RFID tag 200 with separate chips 202, 302 and separate antennas 67A, 67B according to the exemplary embodiment illustrated in FIG. 3A-1. The single encasement 60C may comprise glass, plastic, and/or a biocompatible polymer. The encasement 60C when made from plastic may comprise a thickness of between about 0.20 mm to about 0.70 mm, and preferably about 0.30 mm. However, other dimensions larger or smaller are feasible and are included within the scope of this disclosure as understood by one of ordinary skill in the art. For example, for each of the dimensions noted above, each may be increased or decreased by about 0.50 mm and would be within the scope of this disclosure.

The encasement 60C when made from glass may comprise a thickness of between about 0.30 mm to about 0.40 mm, and preferably about 0.35 mm. However, other dimensions larger or smaller are feasible and are included within the scope of this disclosure as understood by one of ordinary skill in the art. For example, for each of the dimensions noted above, each may be increased or decreased by about 0.5 mm and would be within the scope of this disclosure.

The encasement 60C may enclose a substrate 210 that supports two antennas 67A, 67B and an RFID chip 202, and an NFC chip 302. Further details of exemplary circuitry present within the RFID chip 202 and NFC chip 302 are described below in connection with FIG. 3E.

The encasement 60C when made from glass may have a thickness or height dimension H2 that comprises a range between about 3.5 mm to about 4.0 mm, preferably 3.85 mm. The substrate 210 may comprise a dielectric material (non-conductive material), such as a plastic or a ceramic.

However, other dielectric materials may be used and are included with the scope of this disclosure. The dielectric material for the substrate 210 may comprise composite materials. The composites may contain a matrix (usually an epoxy resin), a reinforcement (usually a woven, sometimes nonwoven, glass fibers, sometimes even paper), and in some cases a filler is added to the resin (e.g. ceramics; titanate ceramics can be used to increase the dielectric constant) as understood by one of ordinary skill in the art.

The thickness or height H1 of the substrate 210 may comprise a range of between about 0.8 mm to about 1.4 mm, and preferably about 1.2 mm. However, other dimensions larger or smaller are feasible and are included within the scope of this disclosure as understood by one of ordinary skill in the art. For example, for each of the dimensions noted above, each may be increased or decreased by about 0.5 mm and would be within the scope of this disclosure.

The first antenna 67A may be coupled to the RFID chip 202. The first antenna 67A may be coupled to the RFID chip via a solder wire 204 and solder pad 206. The solder pad is coupled to the RFID chip 202 by a wire 208 that penetrates/passes through the substrate 210. In a similar manner, the second antenna 67B may be coupled to the NFC chip 302. The second antenna 67B may be coupled to the NFC chip 302 via a second solder wire 204 and a second solder pad 206. The second solder pad 206 is coupled to the NFC chip 302 by a wire 208 that penetrates/passes through the substrate 210.

The first antenna 67A may comprise a coil antenna having insulated wire as understood by one of ordinary skill in the art. In other embodiments, the wire for the antenna 67A may not be insulated as appropriate.

The first antenna 67A supports communications for the RFID chip 202. The first antenna 67A may be tuned for a first radio-frequency (RF) of about 134.2 kHz. However, the first antenna 67A may be tuned for other frequencies higher or lower than this frequency as understood by one of ordinary skill in the art. For example, other frequencies for RFID tags 200 may include, but are not limited to, between about 125.0 KHz to about 148.0 KHz, preferably about 134.2 kHz (low-frequency); and between about 914.0 MHz to about 916.0 MHz, preferably about 915.0 MHz (Ultra-high-frequency). These frequency ranges are applicable to all RFID tags 200 described in this specification.

The second antenna 67B, like the first antenna 67A, may comprise a coil antenna having insulated wire as understood by one of ordinary skill in the art. In other embodiments, the wire for the antenna 67B may not be insulated as appropriate. The second antenna 67B supports communications for the NFC chip 302. The second antenna 67B may be tuned for a second radio-frequency (RF) of about 13.56 MHz. However, the second antenna 67B may be tuned for other frequencies higher or lower than this frequency as understood by one of ordinary skill in the art. For example, other frequencies for NFC tags 300 may include, but are not limited to, between about 12.00 MHz to about 14.00 MHz, between about 13.553 MHz and 13.567 MHz, and preferably at about 13.56 MHz (high-frequency). These frequency ranges are applicable to all NFC tags 300 described in this specification.

Exemplary lengths for the elements within the encasement 60C described above may comprise the following: a length L1 defining a distance between a first end of the encasement 60C and the substrate 210 comprising about 1.0 mm; a second length L2 defining a distance between a first end of the substrate 210 and a first end of the first antenna 67A comprising about 0.5 mm; a third length L3 defining a distance between a first end of the first antenna 67A and a second end of the first antenna 67A comprising about 6.0 mm; a fourth length L4 defining a distance between the second end of the first antenna 67A and a first end of the second antenna 67B comprising about 4.0 mm; a fifth length L5 defining a distance between the first end of the second antenna 67B and a second end of the second antenna 67B comprising about 6.0 mm; a sixth length L6 defining a distance between a the second end of the second antenna 67B and a second end of the substrate 210 comprising about 4.5 mm; and a seventh length L7 defining a distance between the second end of the substrate 210 and a second end of the encasement 60C comprising about 1.0 mm. As understood by one of ordinary skill in the art, these exemplary lengths may be decreased or increased without departing from the scope of this disclosure. For example, for each of the lengths noted above, each may be increased or decreased by about 0.5 mm and would be within the scope of this disclosure.

While the length of the two coil antennas 67A, 67B are the same in this exemplary embodiment illustrated in FIG. 3A-2, one of ordinary skill in the art recognizes that any one of a multitude of variables/parameters may be adjusted relative to these antennas 67A, 67B such that the physical lengths are equal but each may support different frequencies relative to each other. For example, one of the antennas 67 could be provide with a ferro-magnetic core, and/or the gauge of wire used between the two antennas 67 could be different, and/or a tuning circuit/impedance matching circuit (not illustrated, but see circuit 405 of FIG. 3E) could be employed such that the physical lengths of the two antennas 67A, 67B could be the same while the transmitted frequencies could be different/adjusted as understood by one of ordinary skill in the art.

Referring now to FIG. 3B-2, this figure illustrates one exemplary embodiment of a single encasement 60D for an implantable or ingestible NFC tag 300 and RFID tag 200 with a common chip 400 and separate antennas 67A, 67B according to the exemplary embodiment illustrated in FIG. 3B-1. The exemplary embodiment of FIG. 3B-2 shares similar physical characteristics relative to the exemplary embodiment of FIG. 3A-2. Therefore, only the differences between the embodiments illustrated in FIG. 3A-2 and FIG. 3B-2 will be described below.

The first antenna 67A is coupled to a first solder pad 206 via a solder wire 204. The solder pad 206 is coupled to the common chip 400 via a first solder wire 208 that penetrates the substrate 210. Similarly the second antenna 67B is coupled to a second solder pad 206 via a solder wire 204. The second solder pad 206 is coupled to the common chip 400 via a second solder wire 208 that also penetrates the substrate 210.

The first antenna 67A may support radio-frequencies for RFID communications while the second antenna 67B may support radio-frequencies for NFC communications. The common chip 400 may comprise circuitry that supports NFC communications and RFID communications. The common chip 400, thus, may have two sets of circuits that are described below and illustrated in FIG. 3E.

Figures 2I, 3C:
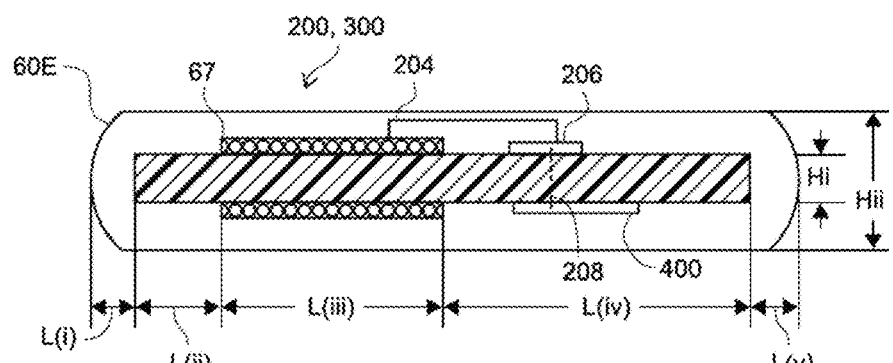
Figures 2, 3C:
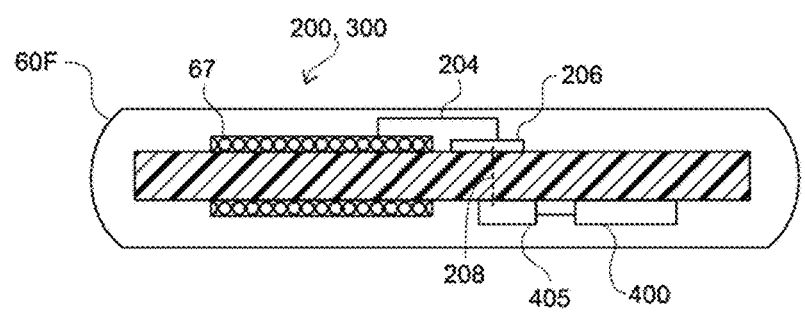

FIG. 3C-2(i) illustrates one exemplary embodiment of a single encasement 60E for an implantable or ingestible NFC tag 300 and RFID tag 200 with a common chip 400 and a single, common antenna 67 for both tags 200, 300 according to the exemplary embodiment illustrated in FIG. 3C-1. The exemplary embodiment of FIG. 3C-1 shares similar physical characteristics relative to the exemplary embodiment of both FIGS. 3A-2 and 3B-2. Therefore, only the differences between the embodiments illustrated in FIG. 3A-2/3B-2 and FIG. 3C-2(i) will be described below.

The single antenna 67 is coupled a solder pad 206 via solder wire/trace 204. The solder pad 206 is also coupled to a solder wire 208 that may penetrate/pass through the substrate 210 to the common chip 400. In addition to the common chip 400 having both NFC circuitry and RFID circuitry for supporting both NFC and RFID communications, the common chip 400 may also comprise a tuning circuit/impedance matching circuit 405 [See FIG. 3E]. The impedance matching circuit 405 may tune/operate the single antenna 67 at both RFID frequencies and NFC frequencies as understood by one of ordinary skill in the art.

Exemplary lengths for the elements within encasement 60E described above may comprise the following: a first length L(i) defining a distance between a first end of the encasement 60E and the substrate 210 comprising about 1.0 mm; a second length L(ii) defining a distance between a first end of the substrate 210 and a first end of the sole antenna 67 comprising about 0.5 mm; a third length L(iii) defining a distance between a first end of the sole antenna 67 and a second end of the sole antenna 67 comprising about 6.0 mm; a fourth length L(iv) defining a distance between the second end of the sole antenna 67 and a second end of the substrate 210 comprising about 3.5 mm; and a fifth length L(v) defining a distance between the second end of the substrate 210 and a second end of the encasement 60E comprising about 1.0 mm. As understood by one of ordinary skill in the art, these exemplary lengths may be decreased or increased without departing from the scope of this disclosure. For example, for each of the lengths noted above, each may be increased or decreased by about 0.5 mm and would be within the scope of this disclosure.

Referring now to FIG. 3C-2(ii), this figure illustrates one exemplary embodiment of a single encasement 60F for an implantable or ingestible NFC tag 300 and RFID tag 200 having a common chip 400 and a single antenna 67 for both tags 200, 300 according to the exemplary embodiment illustrated in FIG. 3C-1. The exemplary embodiment of FIG. 3C-2(ii) shares similar physical characteristics relative to the exemplary embodiment of FIG. 3C-2(i). Therefore, only the differences between the embodiments illustrated in FIG. 3C-2(i) and FIG. 3C-2(ii) will be described below.

The single antenna 67 of this exemplary embodiment of FIG. 3C-2(ii) is coupled to a solder pad 206 via a solder wire 204. The solder pad 206 is coupled to a tuning/impedance matching chip 405 via a solder wire 208 that penetrates/passes through the substrate 210. The tuning/impedance matching chip 405 is coupled to the common chip 400. As described previously, the common chip 400 may have both NFC circuitry and RFID circuitry for supporting both NFC and RFID communications as understood by one of ordinary skill in the art. Details for the common chip 400 are described below in connection with FIG. 4.

Figure 3D:
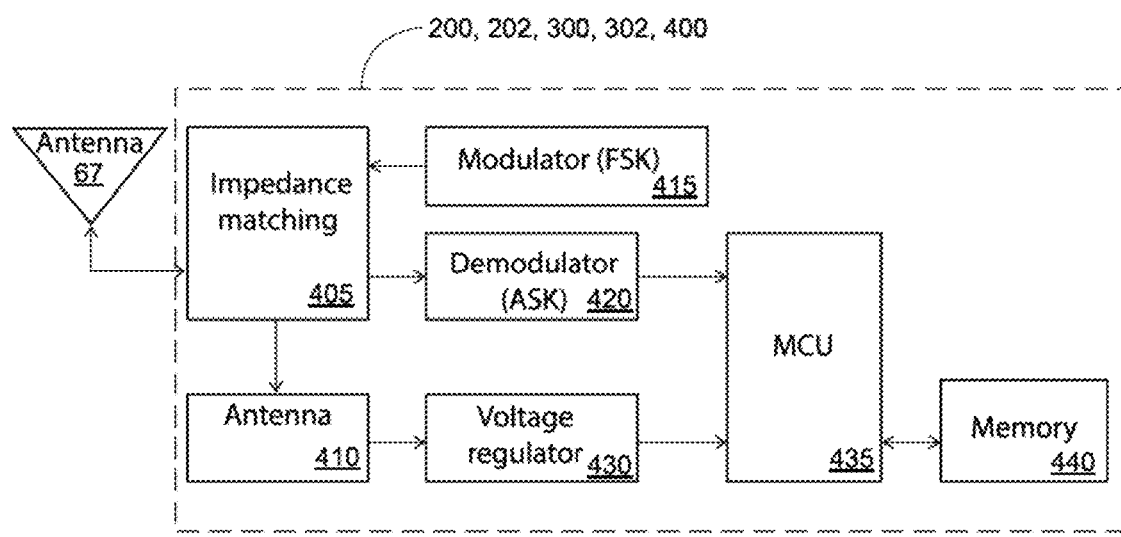
FIG. 3D illustrates a functional block diagram of one exemplary embodiment of circuitry that may form either an RFID chip or an NFC chip, or a chip that has a pair of dual circuits [two duplicates of the single circuit shown] in FIG. 3D for supporting both NFC and RFID communications according exemplary embodiments described herein.

FIG. 3D illustrates a functional block diagram of one exemplary embodiment of circuitry that may form either an RFID chip 200 or an NFC chip 300, or a chip 400 that has a pair of dual circuits [two duplicates of the single circuit shown] in FIG. 3D for supporting both NFC and RFID communications according to exemplary embodiments described herein. An RFID tag 200, an RFID chip 202, an NFC tag 300, an NFC chip 302, and a common chip 400 may comprise an impedance matching circuit/module 405, a power-harvester module 410, a modulator module 415, a demodulator module 420, a voltage regulator 430, a microcontroller unit (MCU) 435, and memory module 440.

The antenna 67 may receive RF energy which is flows through the impedance matching circuit/module 405 to the power-harvester module 410. The power-harvester module 410 may rectify incoming RF energy into direct-current voltage to power the entire chip/system. The voltage regulator 430 smoothes/filters out the DC voltage received from the power harvester module 410. The voltage regular 430 sends its current/voltage to the MCU 435.

Meanwhile, the demodulator module 420 extracts the data stream from the RF carrier wave using amplitude shift keying (ASK) as understood by one of ordinary skill in the art. The demodulator module 420 sends its signals to the MCU 435.

The MCU 435 may read and act on the signals it receives from the demodulator module 420. The MCU 435 may generate signals in response to the signals received from the demodulator module 420. For example, the MCU 435 may be requested to provide a unique identifier for the tag 200, 300. The unique identifier may be stored in memory module 440. The MCU 435 may retrieve the unique identifier from the memory module 440 and then send it to the modulator module 415.

The modular module 415 may then modulate the RF carrier wave with the unique identifier signal received from the MCU 435. The RF carrier wave may then flow through the impedance matching circuit/module 405 where it is then transmitted by the antenna 67. The NFC circuitry/tag 300 described herein may be built according to at least one of these two standards known as of this writing: ECMA-340 and ISO/IEC 18092 as understood by one of ordinary skill in the art. The RFID circuitry/tag 200 described herein may be built according to at least one of these four standards known as of this writing: ISO/IEC 18000; ISO/IEC 29167; ISO/IEC 20248; and ISO/IEC JTC 1/SC 31 as understood by one of ordinary skill in the art.

Figure 4A:
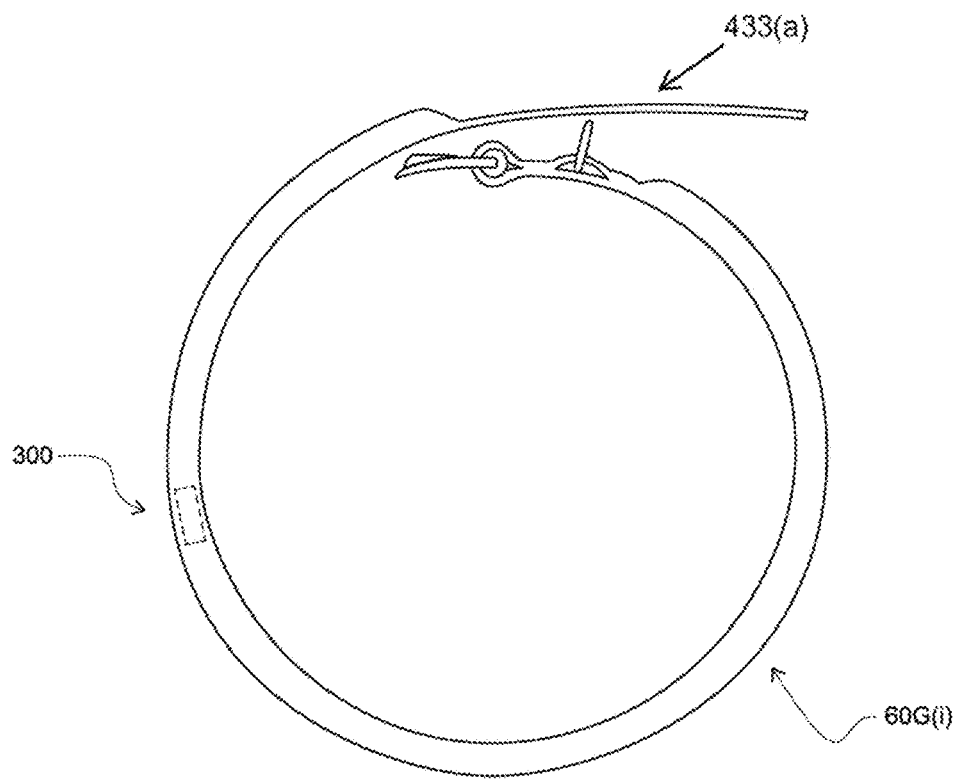
FIG. 4A illustrates an exemplary embodiment of an NFC tag according to principles of the present invention that may be positioned internal to a plastic animal collar.

Referring now to FIG. 4A, this figure illustrates an exemplary embodiment of an NFC tag 300 according to principles of the present invention that may be positioned internal to a plastic animal collar 60G(i). The NFC tag 300 may be affixed to, enclosed in or embedded in the material of a pet collar or other external device 60 for an animal 80 (See FIG. 1 for animal 80). With respect to pets or companion animals 80, such as dogs and cats, this external device or coupling mechanism 60 may be in the form of a pet collar, anti-parasitic pet collar, harness or the like.

With respect to a production animal 80, such as cattle, pigs, goats, sheep or the like, this external device/coupling 60 might take the form of a mountable tag, such as an ear tag, such as illustrated in FIGS. 2-3 described above. With respect to sport animals 80, such as horses or camels, this external device might take the form of a bridle, saddle, harness or the like. With respect to laboratory animals, such as mice, rats rabbits or the like, this external device might take the form of earring, bracelet or collar 60M (See FIGS. 9-10 described below) or the like for application to a leg, neck, foot or the like of the animal 80.

With respect to service or support animals 80, such as guide dogs for blind, search and rescue animals, custom drug detection animals, patrol horses, this external device/coupling 60 might take the form of a harness. With respect to production birds or fowl animals 80, such as chickens, turkeys, ducks and geese, this external device/coupling 60 may take the form of a leg band 60M (See FIGS. 9-10 described below), bracelet, wing tag or bead. With respect to wildlife, the external device/coupling 60 may be of any of the appropriate forms identified above, including implant, collar, ear tag, leg band, wing tag, harness, or bead. While each configuration of the NFC tag 300 described herein is suggested with respect to a particular type of animal, it is contemplated that each configuration of the NFC tag 300 is not limited to any particular type of animal and all permutations and combinations are hereby contemplated by this disclosure as understood by one of ordinary skill in the art. For example, a collar 60G (See FIGS. 4A-5C) could be used for a camel or a horse or an ear tag 60 (See FIGS. 2-3) could be used for a dog.

With respect to external devices/couplers 60 including an NFC tag 300, the tag 300 and its circuitry/chip 302 may be incorporated into or on the device/coupler 60. For example, a pet collar 60G could be made of fabric, leather, plastic, rubber or other material. The collar 60G may have a buckle or plastic clip or other similar closure mechanism 433 (See FIGS. 4A-5C). With respect to fabric, leather or similar material, the NFC tag 300 may be sewn onto or into the fabric or leather or sandwiched between layers of the material and bonded. For a plastic collar 60G(i-iii)(See FIGS. 4A-4C), such as one including an anti-parasitic pharmaceutical compound, the NFC tag 300 may be encased within the material, such as plastic, that is used to form the collar.

The NFC tag 300 may be otherwise attached, affixed, clipped or embedded in or to the collar by other known methods. Similar fabrications can be used for harnesses, bridles, saddles, leg bands, wing tags, bracelets, beads or the like. The NFC tag 300 may simply be affixed by known methods to the external device 60G by known methods such as glue, stamping, riveting or the like. An RFID tag 200 (not illustrated with couplers 60) may be co-hosted and mounted in a similar fashion.

FIGS. 4A-C and 5(a)-(c) are schematic illustrations of the NFC tag 300 with respect to a collar 60. Although the figures illustrate a collar 60 with a buckle closure, the invention contemplated herein is not limited to any particular closure mechanism. For example, if the collar 60 is fabric, the NFC tag 300 may be sewn in or sealed between two layers of fabric. If the collar 60 is plastic, the NFC tag 300 may be molded within. When the NFC tag 300 is incorporated into the pet collar 60, the pet collar 60 may be imprinted with a notice to indicate that an NFC tag 300 is included at specific location of the pet collar 60. Alternatively, the information may molded into the material of the collar, for example via the mold used for injection molding.

Referring again to FIG. 4A, this figure illustrates an exemplary embodiment of an NFC tag 300 according to principles of the present invention that may be positioned internal to a plastic animal collar 60G(i). According to this exemplary embodiment, the NFC tag 300 may be embedded within the plastic animal collar 60G(i). Thus the NFC tag 300 has been illustrated with dashed lines to indicate it is hidden from view with respect to the external view of the collar 60G(i) illustrated in FIG. 4A. The NFC tag 300 may have a small chip 302 and an antenna 67B which are not visible in this view. The NFC tag 300 may have the same structure and functions as discussed above in connection with the schematic of FIG. 3D described above.

The closure mechanism 433A of this exemplary embodiment in FIG. 4A may comprise a buckle that has a projecting member that penetrates various holes (not shown) that are in the plastic animal collar 60G(i) as understood by one of ordinary skill in the art. The various holes allow for the adjustment of fit of the animal collar 60G(i) around the neck of the animal 80 (not shown, but See FIG. 1).

Figure 4B:
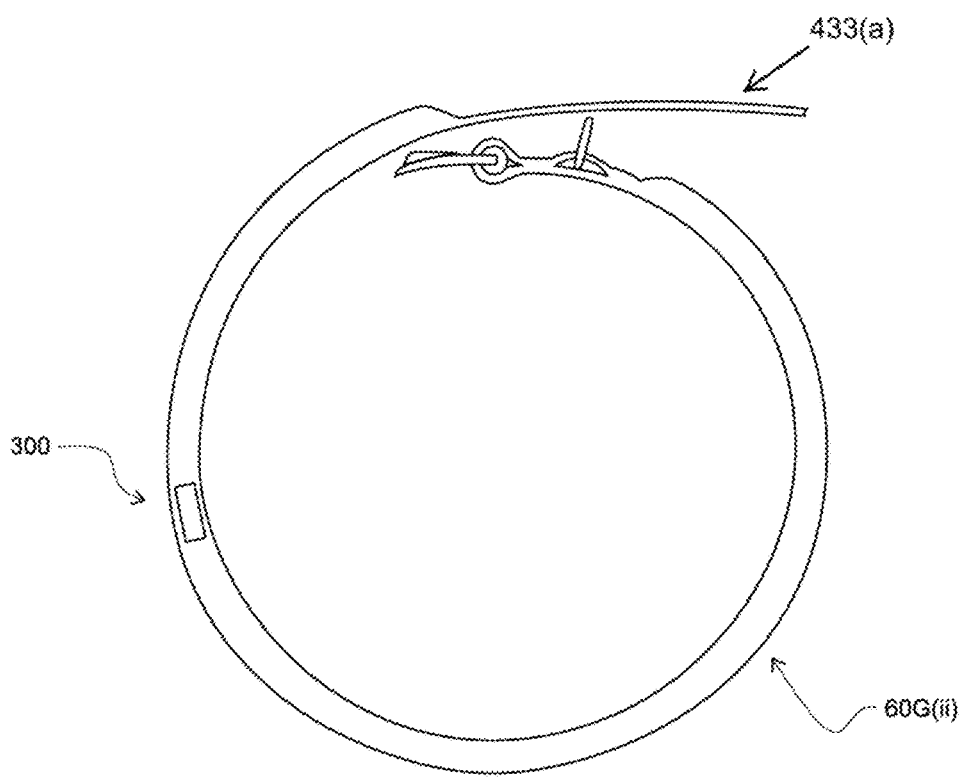
FIG. 4B illustrates an exemplary embodiment of an NFC tag according to principles of the present invention that may be positioned external to a plastic animal collar.

Referring not to FIG. 4B, this illustrates an exemplary embodiment of an NFC tag 300 according to principles of the present invention that may be positioned external to a plastic animal collar. FIG. 4B is similar to the embodiment of FIG. 4A. Therefore, only the differences between these two animal collars 60 will be described below.

In this exemplary embodiment, the NFC tag 300 is attached/affixed to an external portion of the collar 60G(ii), where the collar 60G(ii) is made from a plastic material. The NFC tag 300 may be attached/affixed by anyone of known fastening techniques such as by glue, sonic welding, etc.

Figure 4C:
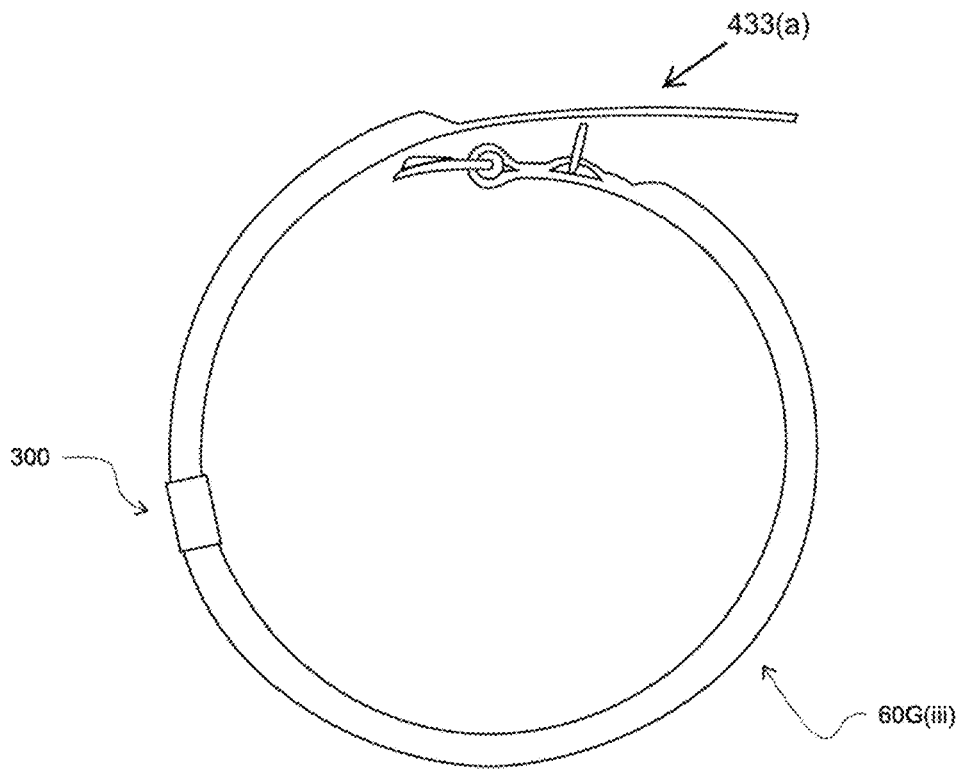
FIG. 4C illustrates another exemplary embodiment of an NFC tag according to principles of the present invention external to an animal collar and which forms part of the body of the animal collar.

Referring now to FIG. 4C, this figure illustrates another exemplary embodiment of an NFC tag 300 according to principles of the present invention external to an animal collar 60G(iii) and which forms part of the body of the animal collar 60G(iii). FIG. 4C is similar to the embodiment of FIG. 4A. Therefore, only the differences between these two animal collars 60 will be described below.

According to this exemplary embodiment, the NFC tag 300 may have a larger housing and/or mechanical structure such that the NFC tag 300 forms a portion of the animal collar 60G(iii), where the collar 60G(iii) is made from a plastic material. The NFC tag 300 in this exemplary embodiment has a housing that is permanently attached to two ends of the animal collar 60G(iii).

The housing of the NFC tag 300 may be provided with a size and shape such that it mirrors the size and shape of the animal collar 60G(iii). While the NFC tag 300 illustrated in FIG. 4C has been depicted with a size and shape that is slightly larger than the size and shape of the collar 60G(iii), it is feasible to create a NFC tag 300 having a housing which has an identical size and shape as the collar 60G(iii) as discussed above and as understood by one of ordinary skill in the art.

Figure 5A:
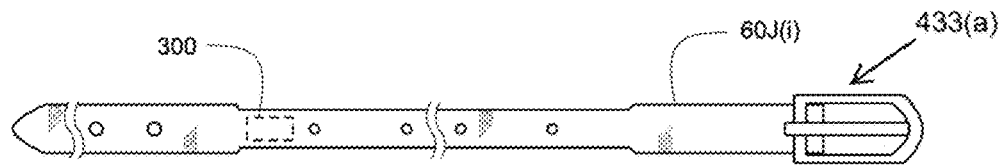
FIG. 5A illustrates an exemplary embodiment of an NFC tag according to principles of the present invention internal to an animal collar made from leather.

Referring now to FIG. 5A, this figure illustrates an exemplary embodiment of an NFC tag 300 according to principles of the present invention internal to an animal collar 60J(i) made from leather. FIG. 5A is similar to FIG. 4A. Therefore, only the differences between these two animal collars 60G(i) and 60J(i) will be described below.

Similar to the embodiment of FIG. 4A, the NFC tag 300 of this embodiment may be embedded/enclosed with the fabric/leather structure of the animal collar 60J(i). The animal collar 60J(i) may have a non-uniform cross-sectional shape in which the ends have a greater thickness compared to a mid-section of the collar 60J(i). However, it is possible to produce a leather collar 60J(i) having a uniform cross-sectional shape and thickness as understood by one of ordinary skill in the art.

Figure 5B:
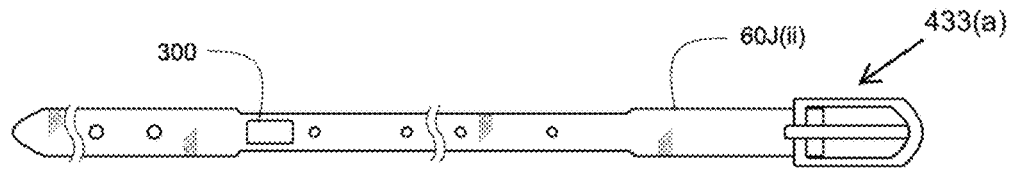
FIG. 5B illustrates an exemplary embodiment of an NFC tag according to principles of the present invention external to an animal collar made from leather.

Referring now to FIG. 5B, this figure illustrates an exemplary embodiment of an NFC tag 300 according to principles of the present invention external to an animal collar 60J(ii) made from leather. FIG. 5B is similar to FIG. 4B. Therefore, only the differences between these two animal collars 60G(ii) and 60J(ii) will be described below.

Like the embodiment illustrated in FIG. 4B, the NFC tag 300 of this embodiment of FIG. 5B may be attached/ permanently fixed to an external portion of the leather collar 60J(ii). The NFC tag 300 will generally have housing that is smaller than a thickness of the leather collar 60J(ii).

Figure 5C:
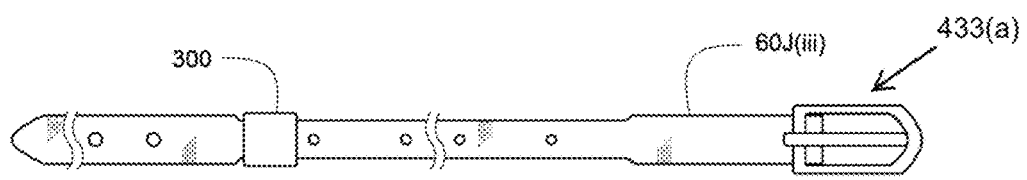
FIG. 5C illustrates another exemplary embodiment of an NFC tag according to principles of the present invention external to an animal collar leather.

Referring now to FIG. 5C, this figure illustrates an exemplary embodiment of an NFC tag 300 according to principles of the present invention external to an animal collar 60J(ii) made from leather. FIG. 5C is similar to FIG. 4C. Therefore, only the differences between these two animal collars 60G(iii) and 60J(iii) will be described below.

Like the embodiment of FIG. 4C, the NFC tag 300 has a housing which fastens to at least two ends of the leather collar 60J(iii). While the NFC tag 300 illustrated in FIG. 5C has been depicted with a size and shape that is slightly larger than the size and shape of the collar 60J(iii), it is feasible to create a NFC tag 300 having a housing which has an identical size and shape as the collar 60J(iii) as discussed above and as understood by one of ordinary skill in the art.

Referring generally to FIGS. 6-10, the NFC tags 200 and RFID tags 200 referenced in these figures will have the functionality and circuitry described above in connection with FIG. 3D. Referring now to FIG. 6A, this figure illustrates an exemplary embodiment of an animal ear tag 600. Typically, such devices are made of plastic, rubber or other suitable material and may include an RFID tag 200 (See FIG. 6C) often at the rivet/attaching point 602 (i.e. —approximate geometric center) for affixing the tag 200 to the animal 80 [not shown in this figure], as illustrated in FIG. 6B.

The ear tag 600 may comprise a rectangular-shaped portion or region 607 such that tag information 609 may be imprinted thereon. The tag 600 is not limited to rectangular shapes. Other polygonal shapes are possible and are included within the scope of this disclosure. For example, other shapes include, but are not limited, triangular, square, pentagonal, octagonal, etc. Further, curved shapes, such as, but not limited to, circular, elliptical, etc. are included with possible geometries for the ear tag 600.

Tag information 609 may comprise alpha-numeric characters that may be applied with a machine and/or may be hand-written by a human. Tag information 609 may comprise alpha-numeric characters that are supplied by an animal owner according to an identification system that are used for production animals 80, such as cattle. The Tag information 609 may comprise ink and/or it may be applied by a mechanical stamping device and physically imprinted on the rectangular portion 607 of the animal tag 600.

Referring now to FIG. 6C, this figure illustrates an exemplary embodiment of an RFID tag 60K(i) having a button type structure that may function as a fastener and couple to rivet point 602 of a tag 600, such as illustrated in FIG. 6B. The RFID antenna 67A (not visible) may comprise a coil antenna as understood by one of ordinary skill in the art.

Figure 6D:
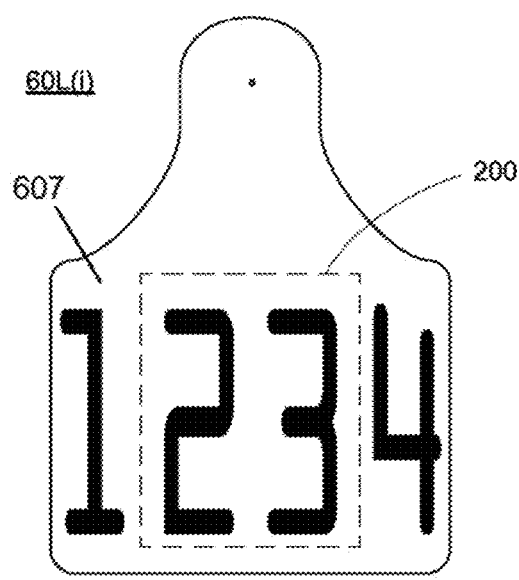
FIG. 6D illustrates an exemplary embodiment of an RFID tag within the body of the ear tag of FIG. 6A.

Referring now to FIG. 6D, this figure illustrates an exemplary embodiment of an RFID tag 200 within the body, and specifically, the rectangular portion 607 of the ear tag 60L(i) of FIG. 6A. In this exemplary embodiment, an ordinary button/fastener (see FIG. 7A-4 for fastener 720) is used to fasten this ear tag 60L(i) to an animal 80, such as a production animal 80 like cattle.

Figures 1, 7A:
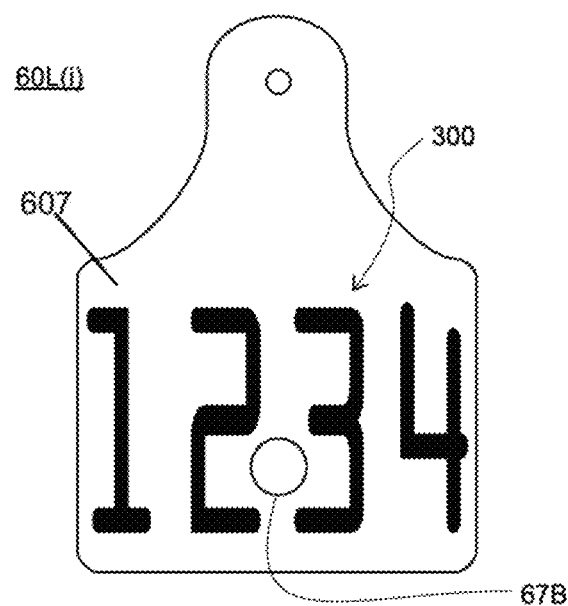

Referring now to FIG. 7A-1, this figure illustrates an exemplary embodiment of an NFC tag 300 within an ear tag 60L(i), similar to the plain tag 600 of FIG. 6A but with an antenna 67B in a rectangular portion of the tag 60J. The NFC tag 300 may comprise a loop antenna 67B described in further detail below in connection with FIG. 7A-2.

Referring now to FIG. 7A-2, this figure illustrates an exemplary embodiment of a rear view of the NFC tag 300 illustrated in FIG. 7A-1 but with a cut-away view. The cut-away view illustrates more details of the antenna 67B and a region/section of the ear tag 60L(i) that may be encased/enveloped by a pouch/volume/space 705 for receiving the antenna 67B and the NFC chip 302.

The pouch 705 for containing/enveloping the antenna 67B and NFC chip 302 may have length dimension L7A(i) of about 65.0 mm and a width dimension W7A(i) of about 47.0 mm. The rectangular border 710 [outermost rectangular shape] surrounding the pouch 705 [which has the innermost rectangular shape] may have a thickness of about 3.0 mm. The rectangular border 710 is usually formed by a sonic weld as understood by one of ordinary skill in the art.

The ear tag 60I may comprise a length dimension L7A(ii) of about 74.0 mm. The ear tag may also comprise a width dimension of about 56.0 mm. However, other dimensions larger or smaller are feasible and are included within the scope of this disclosure as understood by one of ordinary skill in the art. For example, for each of the dimensions noted above, each may be increased or decreased by about 0.5 mm and would be within the scope of this disclosure.

Referring now to FIG. 7A-3, this figure illustrates a plain, rear view of the exemplary embodiment of the NFC tag 300 illustrated in FIG. 7A-1. Similar to the exemplary embodiment illustrated in FIG. 6B, this exemplary embodiment may comprise a rivet point 602 that is part 715 of the ear tag 60I. Part 715 may be referred to as a neck portion relative to the rectangular pouch 705 not shown with any lines in this FIG. 7A-3.

Referring now to FIG. 7A-4, this figure illustrates a perspective view of a button structure/fastener 720 that may be used at rivet point 602 for the exemplary embodiments of FIG. 7A to fasten the tag structure 60L(i) to an animal 80. This perspective view of the button structure 720 illustrates an exemplary rivet 725 having a height dimension H7A(i). The end of the fastener 720 may comprise a pointed end, such as based on a conical geometry (i.e. a cone). But other shapes such a flat or a wedge shape are possible for the fastening end and are within the scope of the invention.

This height dimension H7A(i) of the fastener 720 may comprise a magnitude of about 25.0 mm. The rivet 725 may have an internal diameter of about 5.0 mm. Meanwhile, the button structure 720 may comprise an outer diameter dimension D7A(iii). This outer diameter dimension D7A(iii) may comprise a magnitude of about 30.0 mm. One of ordinary skill in the art recognizes that other dimensions smaller or larger are feasible and are included within the scope of this disclosure. For example, for each of the dimensions noted above, each may be increased or decreased by about 0.5 mm and are within the scope of this disclosure.

The fastener(s) 720 of this disclosure are not limited to rivet(s). Other fasteners 720 that may be used include, but are not limited to, clips, screws, nails, adhesives, etc. The material for such fasteners 720 may include, but are also not limited to, plastics, metals, composites etc. as understood by one of ordinary skill in the art.

Referring now to FIG. 7A-5, this figure illustrates a front perspective view of the exemplary embodiment of the NFC tag 300 illustrated in FIG. 7A-1. This perspective view illustrates how a rivet receptacle 730 has a height dimension H7A(ii). The rivet receptacle mates with the button structure/fastener 720 of FIG. 7A-4. The height dimension H7A(ii) may comprise a magnitude of about 10.0 mm. The rivet receptacle 730 may have an inner diameter of about 6.0 mm. One of ordinary skill in the art recognizes that other dimensions smaller or larger are feasible and are included within the scope of this disclosure. For example, for each of the dimensions noted above, each may be increased or decreased by about 0.5 mm and would be within the scope of this disclosure.

Figures 1, 7B:
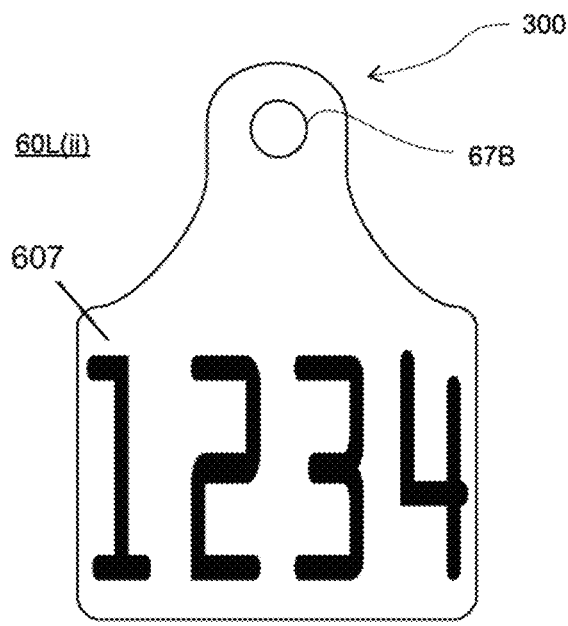

Referring now to FIG. 7B-1, this figure illustrates an exemplary embodiment of an NFC tag 300 within an ear tag 60L(ii), similar to the plain tag 600 of FIG. 6A, but with an antenna 67B near a rivet point 602 for the tag 60L(ii). The NFC tag 300 at the rivet point 602 may comprise a loop antenna 67B that is integral with the ear tag structure 60L(ii) described in further detail below in connection with FIG. 7B-2.

In other words, according to this exemplary embodiment illustrated in FIG. 7B-1, the NFC tag 300 is permanently attached/fixed/welded to the entire tag structure 60L(ii). The NFC tag 300 is integral with the tag structure 60L(ii) and the tag 300 may be formed integrally during manufacture of the entire tag structure 60L(ii) or it is made integral in a few steps such that it is a single body/entity after manufacturing. The integral tag structure 60L(ii) having an NFC antenna 300 will require a rivet/fastener 720 (See FIG. 7A-4) to secure it at rivet point 602 to an animal 80.

Referring now to FIG. 7B-2, this figure illustrates further details of the NFC tag 300 integral with the entire tag 60L(ii) of FIG. 7B-1. The button type tag/ring structure 743 which houses the antenna 67B (not visible in this figure) is part of and integral to the entire tag structure 60L(ii). Even the ring structure 743 appears to be separate geometry relative to the entire tag structure 60L(ii) that includes the rectangular portion 607, the two structures 743, 60L(ii) may be fused/joined together. In other exemplary embodiments (not illustrated), the bottom portion/lower half of the ring structure 743 may be part of the neck portion which is just above the rectangular portion 607.

Figures 1, 7C:
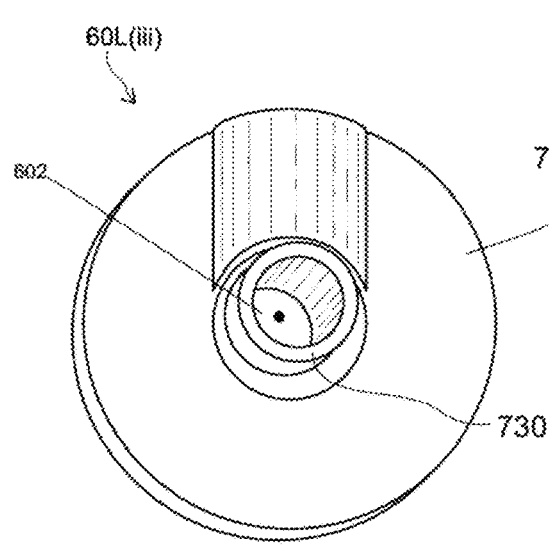
Figures 2, 7C:
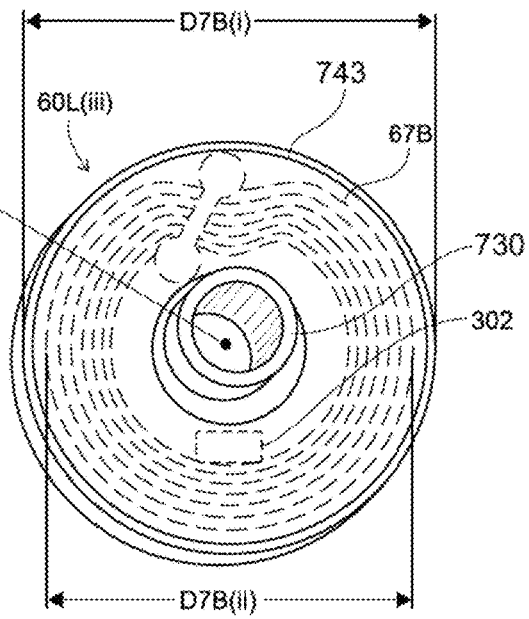
Figures 2, 7B:
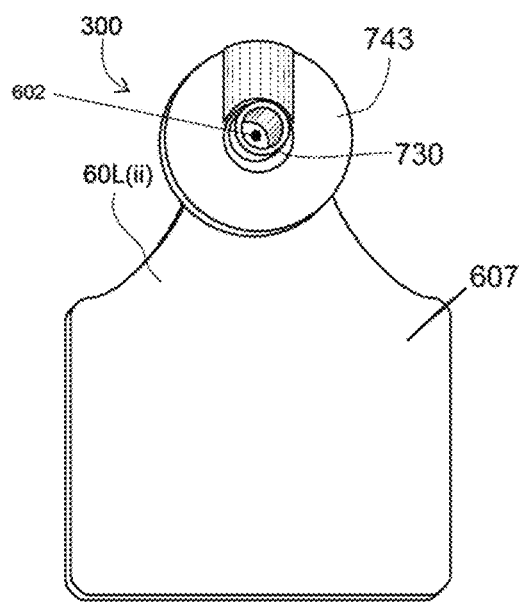

Referring now to FIG. 7C-1, this figure illustrates a button type structure 60L(iii) similar to the exemplary embodiment of FIG. 6C and the exemplary embodiment of 60L(ii) of FIG. 7B where the circular/ring portion 743 may comprise an antenna for an NFC tag according to an exemplary embodiment. The button type structure 60L(iii) may comprise a rivet point 602, a receptacle 730, and a ring structure/portion 743. To attach this structure 60L(iii) to an animal 80 a fastener, such as fastener 720 of FIG. 7A-4 may be used. Other fasteners besides the one illustrated in FIG. 7A-4 may employed without departing from the scope of this disclosure as understood by one of ordinary skill in the art.

Referring now to FIG. 7C-2, this figure illustrates a cut-away view of the button type tag structure 60L(iii) illustrated in FIG. 7B-1. This cut-away view provides details for the antenna 67B that is coupled to an NFC chip 302. The circular, planar portion 743 of the button structure which supports the antenna 67B may comprise an outer diameter dimension D7B(i). This outer diameter dimension D7B(i) may comprise a magnitude of about 30.0 mm. Meanwhile, the coil antenna 67B may comprise an outer dimension D7B(ii). This outer dimension D7B(ii) may comprise a magnitude of about 30.0 mm. One of ordinary skill in the art recognizes that other dimensions smaller or larger are feasible and are included within the scope of this disclosure. For example, for each of the dimensions noted above, each may be increased or decreased by about 0.5 mm and would be within the scope of this disclosure.

According to principles of the present invention, an ear tag 60 may be "dual mode" for the purposes of identifying animals. In several configurations described herein, the operating frequencies of NFC tag 300 and RFID tag 200 may be set such that they do not interfere with each other and allow for "dual applicability" of the tags, allowing users with either type of technology to access information about the animal, and services provided with respect to at least the NFC tag, as described in more detail below.

Figures 2, 8B:
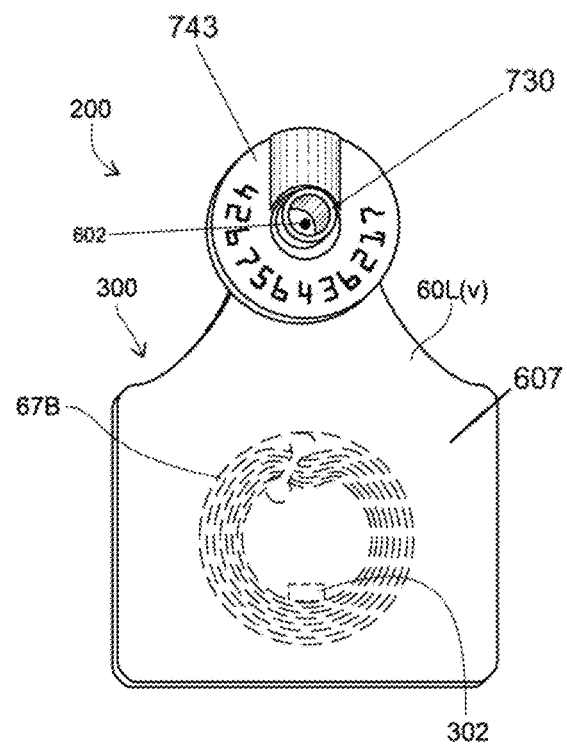
Figure 8A:
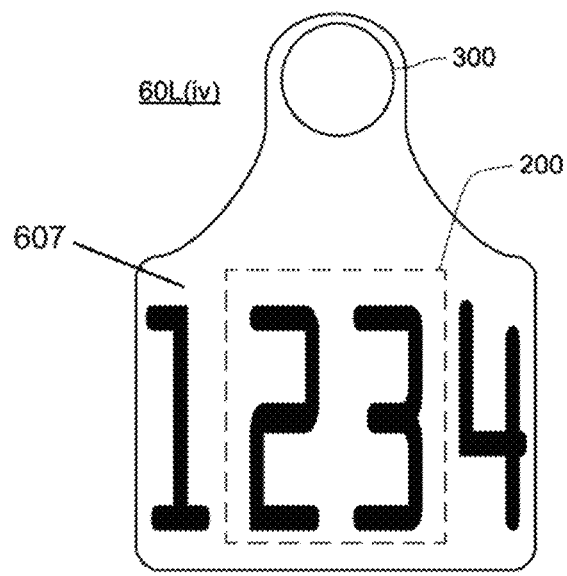
FIG. 8A illustrates an NFC tag that may be positioned in the circular part of the ear tag functioning as the receptacle for a rivet while an RFID tag may be positioned within the rectangular portion of the structure.
Figures 1, 8B:
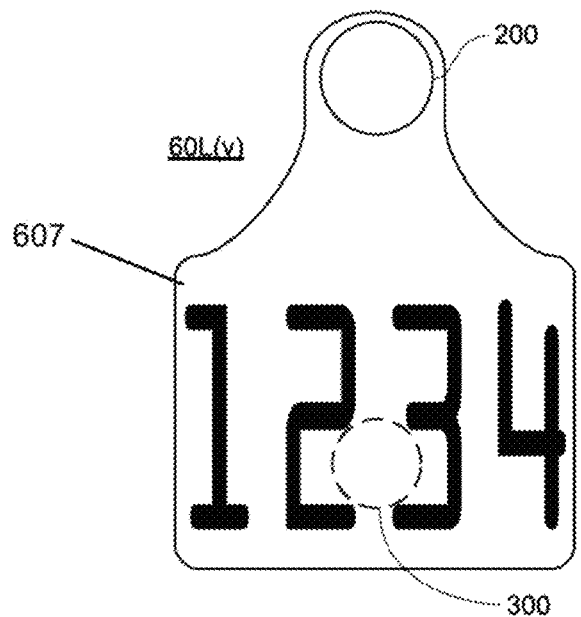

As an example "dual mode" ear tag 60, see FIG. 8A. This figure illustrates an NFC tag 300 that may be positioned in the circular part of the ear tag 60L(iv), functioning as the receptacle for a rivet. And an RFID tag 200 may be included in the flat/rectangular part 607 of the ear tag 60L(iv).

Referring now to FIG. 8B-1, this figure illustrates an opposite embodiment relative to FIG. 8A in which the NFC tag 300 may be positioned in the flat/rectangular part 607 while the RFID tag 200 is included in the circular part functioning as the rivet receptacle for the tag structure 60L(v). Further details of the exemplary embodiment are illustrated in FIG. 8B-2.

In FIG. 8B-2, details of the NFC antenna 67B and its corresponding NFC chip 302 are visible in this cut-away view. The exemplary embodiment of FIG. 8B basically combines the RFID tag 200 of FIG. 6C with the exemplary embodiment illustrated in FIG. 7A. The RFID antenna 200 may be formed and/or permanently attached to the entire tag structure 60L(v), similar to the embodiment described above in FIGS. 7B-1 and 7B-2 where the NFC tag 300 is permanently to attached/formed integral with its tag structure 60L(ii).

Like the NFC tag 300 of FIG. 7B, the RFID tag 200 of FIG. 8B-2 may comprise a receptacle 730 for receiving a fastener, like the rivet 720 of FIG. 7A-4. The RFID tag 200 may further comprise a ring/circular structure 743 for housing its coil antenna (not visible in this figure). The center of the cylinder receptacle 730 may provide the rivet point 602 for the fastener 720 to penetrate through when attaching the tag structure 60L(v) to an animal 80.

Figure 8D:
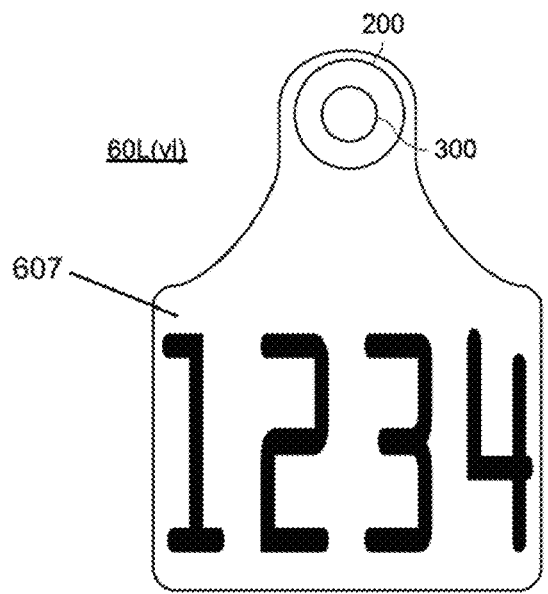
FIG. 8D illustrates an exemplary embodiment of both an RFID tag and an NFC tag at a rivet point of the ear tag of FIG. 6A.
Figure 8C:
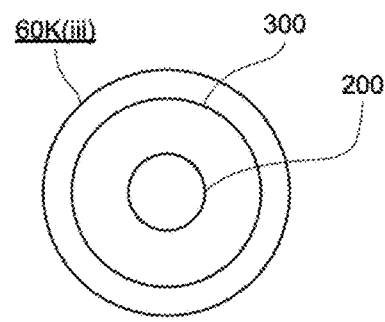
FIG. 8C illustrates an exemplary embodiment of both an RFID tag and an NFC tag at a rivet point of a button type ear tag.

Referring now to FIG. 8C, this figure illustrates an exemplary embodiment of both an RFID tag 200 and an NFC tag 300 at a rivet point of a button type ear tag 60K(iii). According to this exemplary embodiment, the coil antenna 67A (not visible in this figure) for the RFID tag 200 may comprise a smaller diameter and may be positioned within the larger coil antenna 67B (not visible in this figure) for the NFC tag 300.

Referring now to FIG. 8D, this figure illustrates an exemplary embodiment of both an RFID tag 200 and an NFC tag 300 at a rivet point of the ear tag 60L(vi) of FIG. 6A. Opposite to the exemplary embodiment described above depicted in FIG. 8C, in this exemplary embodiment, the coil antenna 67B (not visible in this figure) for the NFC tag 300 may comprise a smaller diameter and may be positioned within the larger coil antenna 67A (not visible in this figure) for the RFID tag 200.

Figure 8E:
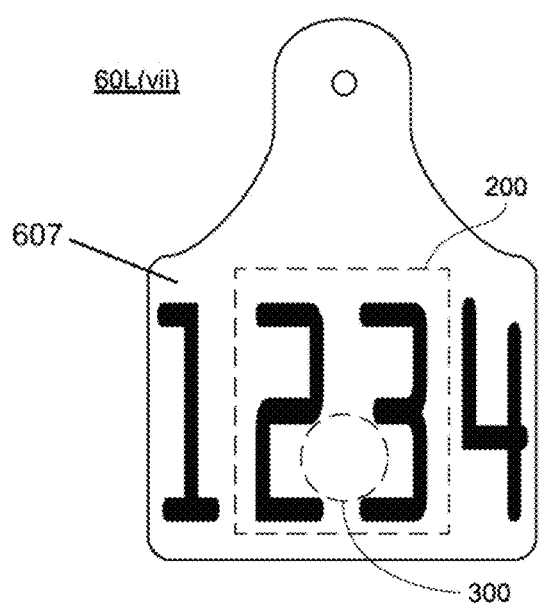
FIG. 8E illustrates an exemplary embodiment of both an RFID tag and an NFC tag within the ear tag of FIG. 6A.

Referring now FIG. 8E, this figure illustrates an exemplary embodiment of both an RFID tag 200 and an NFC tag 300 within the ear tag 60L(vii) of FIG. 6A. Specifically, both tags 200 and 300 may be positioned within the rectangular portion 607 of the tag structure 60L(vii). According to this exemplary embodiment, the RFID tag 200 may have circuitry and/or its antenna 67A (not visible) that contains/circumscribes the area which is occupied by the NFC tag 300.

Figure 8F:
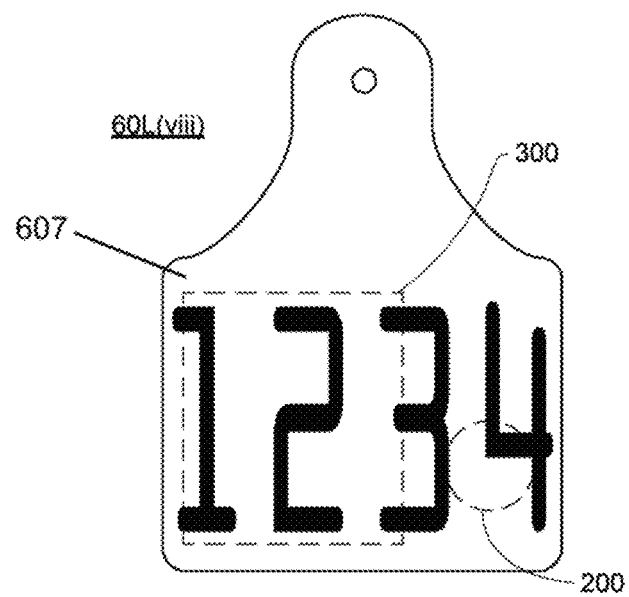
FIG. 8F illustrates another exemplary embodiment of both an RFID tag and an NFC tag within the ear tag of FIG. 6A.

Referring now to FIG. 8F, this figure illustrates another exemplary embodiment of both an RFID tag 200 and an NFC tag 300 within the ear tag 60L(viii) of FIG. 6A. Specifically, both tags 200 and 300 may be positioned within the rectangular portion 607 of the tag structure 60L(viii). According to this exemplary embodiment, the RFID tag 200 may be positioned adjacent to the NFC tag 300 where both occupy the rectangular portion 607. According to this exemplary embodiment, the NFC tag 200 may occupy a surface area which is less than a surface area occupied by the NFC tag 300 as indicated by the dashed lines.

Figure 8G:
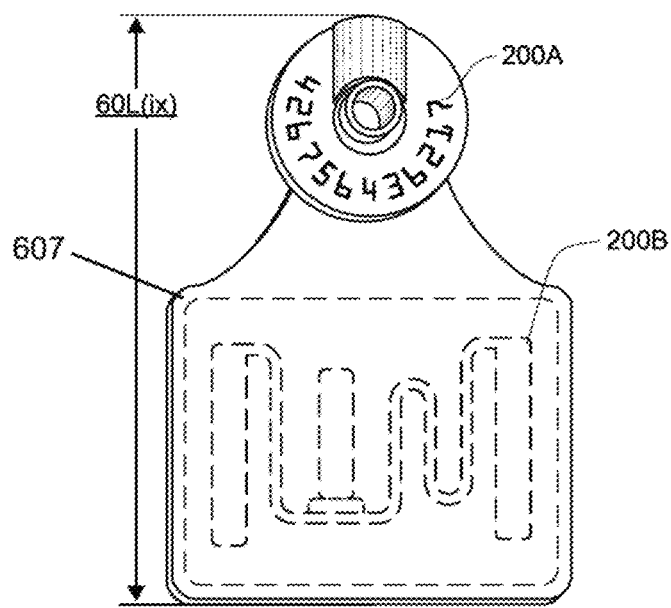
FIG. 8G illustrates another exemplary embodiment of a dual mode RFID tag system in which a first RFID tag forms a receptacle for receiving a fastener and a second RFID tag that is formed in a rectangular portion of the structure.

Referring now to FIG. 8G, this figure illustrates another exemplary embodiment of a dual mode RFID tag system 60L(ix) in which a first RFID tag 200A forms a receptacle for receiving a fastener and a second RFID tag 200B that is formed in a rectangular portion 607 of the structure 60L(ix). The antenna for the first RFID tag 200A may comprise a coil antenna (not visible). The first RFID tag 200A may be characterized as a Low-Frequency tag operating at a frequency of about 134.2 kHz.

Meanwhile, the antenna for the second RFID tag 200B may comprise a di-pole antenna as understood by one of ordinary skill in the art. The second RFID tag 200B may be enveloped/formed within the rectangular portion 607 similar to the coil antenna 67B described above in connection with FIG. 7A-2. The second RFID tag 200B may be characterized as a ultra-high-frequency (UHF) tag which operates in a frequency range of between about 840.0 to about 960.0 Mhz. The second RFID tag 200B may occupy an surface area that is between about 30.0 mm by about 50.0 mm. Other dimensions are possible and are included within the scope of this disclosure as understood by one of ordinary skill in the art. For example, for each of the dimensions noted above, each may be increased or decreased by about 0.5 mm and would be within the scope of this disclosure.

Referring now to FIG. 8H-1, this figure illustrates an exemplary embodiment of a triple mode tag 60L(x) in which a first RFID tag 200A forms a receptacle for receiving a fastener (i.e. —720 of FIG. 7A-4) and a second RFID tag 200B that is formed in a rectangular portion 607 of the structure 60L(x) along with an NFC tag 300 that is also formed in the rectangular portion 607 of the structure 60L(x).

According to this exemplary embodiment, each tag has its own chip. As shown in FIG. 8H-1, the NFC tag 300 has its own chip 302 and antenna. Similarly, the second RFID tag 200B has its own chip 202 and its own antenna which comprises two rectangular patch antennas. While not visible in FIG. 8H-1, the first RFID tag 200A has its own coil antenna and its own chip 202 (not visible).

The first RFID tag 200A may be characterized as low-frequency (LF) and may operate at about 134.2 kHz. The NFC tag 300 may be characterized as high-frequency (HF) and may operate at about 13.56 Mhz. Meanwhile, the second RFID tag 200B may be characterized as ultra-high-frequency (UHF) and it may operate at between about 840.0 and about 960.0 Mhz. The NFC antenna may have a diameter of about 25.0 mm and each patch of the UHF antenna may have a size of about 15.0 mm by about 60.0 mm, where the dimensions 15.0 mm×60.0 mm may comprise the total footprint of the UHF antenna of the second RFID tag 200B with some bleed space for the machine cutout if the inlay on the substrate is cut to size.

Each patch antenna of FIG. 8H-1 may comprise dimensions between about 12.0 mm by about 12.0 mm square. One of ordinary skill in the art recognizes that other dimensions smaller or larger are feasible and are included within the scope of this disclosure. For example, for each of the dimensions noted above, each may be increased or decreased by about 0.5 mm and would be within the scope of this disclosure. Further, other shapes for the antennas are possible, especially when/if their respective dimensions are adjusted. However, other dimensions larger or smaller are feasible and are included within the scope of this disclosure as understood by one of ordinary skill in the art. For example, for each of the dimensions noted above, each may be increased or decreased by about 0.5 mm and would be within the scope of this disclosure.

Referring now to FIG. 8H-2, this figure illustrates an exemplary embodiment of a triple mode tag L(x)'(prime) in which a first RFID tag 200A forms a receptacle for receiving a fastener (i.e. —720 of FIG. 7A-4) and a second RFID tag 200B that is formed in a rectangular portion 607 of the structure 60L(x) along with an NFC tag 300 that is also formed in the rectangular portion 607 of the structure 60L(x). This exemplary embodiment of FIG. 8H-2 is similar to the exemplary embodiment of FIG. 8H-1. Therefore, only the differences between these two exemplary embodiments will be described below.

According to this exemplary embodiment of FIG. 8H-2, the positions of the second RFID tag 200B and the NFC tag 300 are flipped/reversed relative to the embodiment of FIG. 8H-1. This means the coil antenna of the NFC tag 300 is positioned closer to the bottom portion of the tag L(x)' while the two patch antenna for the second RFID tag 200B are positioned within a mid-portion of the rectangular section 607 of the tag L(x)'.

Referring now to FIG. 8H-3, this figure illustrates an exemplary embodiment of a dual mode tag L(x)" (double-prime) in which a single RFID tag 200B is formed in a rectangular portion 607 of the structure along with an NFC tag 300 that is also formed in the rectangular portion 607 of the structure. This exemplary embodiment of FIG. 8H-3 is similar to the exemplary embodiment of FIG. 8H-2. Therefore, only the differences between these two exemplary embodiments will be described below. According to exemplary embodiment of FIG. 8H-3, the RFID tag 200A which is present in the embodiment of FIG. 8H-2 has been omitted/removed, leaving only a single RFID tag 200B.

Referring now to FIG. 8I-1, this figure illustrates an exemplary embodiment of a triple mode tag 60L(xi), similar to the embodiment of FIG. 8H-1, in which a first RFID tag 200A forms a receptacle for receiving a fastener (i.e. 720 of FIG. 7A-4) and a second RFID tag 200B that is formed in a rectangular portion 607 of the structure 60L(xi) along with an NFC tag 300 that is also formed in the rectangular portion 607 of the structure. This exemplary embodiment is similar to the one illustrated in FIG. 8H-1. So only the differences between these two exemplary embodiments will be described.

According to this exemplary embodiment of FIG. 8I-1, the second RFID tag 200B and NFC tag 300 share the same electronic chip 400 for their respective tuning circuitry. This is similar to the exemplary embodiments described above such as in FIGS. 3B-3C where tags 200, 300 share a common chip 400 as described above.

Referring now to FIG. 8I-2, this figure illustrates an exemplary embodiment of a triple mode tag 60L(xi)' (prime) in which a first RFID tag 200A forms a receptacle for receiving a fastener and a second RFID tag 200B that is formed in a rectangular portion 607 of the structure along with an NFC tag 300 that is also formed in the rectangular portion of the structure, where the second RFID tag 200B and NFC 300 tag share the same electronic chip for their respective tuning circuitry. This exemplary embodiment of FIG. 8I-2 is similar to the exemplary embodiment of FIG. 8I-1. Therefore, only the differences between these two exemplary embodiments will be described below.

According to this exemplary embodiment of FIG. 8I-2, the positions of the second RFID tag 200B and the NFC tag 300 are flipped/reversed relative to the embodiment of FIG. 8H-1. This means the coil antenna of the NFC tag 300 is positioned closer to the bottom portion of the tag L(xi)' while the two patch antenna for the second RFID tag 200B are positioned within a mid-portion of the rectangular section 607 of the tag L(xi)'. And both the second RFID tag 200B and NFC tag 300 share the same chip 400 as described above.

FIG. 8I-3 illustrates an exemplary embodiment of a dual mode tag L(xi)" (double-prime) in which an RFID tag 200B is formed in a rectangular portion 607 of the structure along with an NFC tag 300 that is also formed in the rectangular portion 607 of the structure, where the second RFID tag 200B and NFC tag 300 share the same electronic chip for their respective tuning circuitry. This exemplary embodiment of FIG. 8I-3 is similar to the exemplary embodiment of FIG. 8I-2. Therefore, only the differences between these two exemplary embodiments will be described below. According to this exemplary embodiment of FIG. 8I-3, the RFID tag 200A which is present in the embodiment of FIG. 8H-2 has been omitted/removed, leaving only a single RFID tag 200B.

Figure 9:
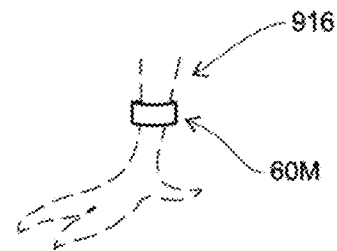
FIG. 9 illustrates an exemplary embodiment of the present invention for attachment as a band or bracelet.

FIG. 9 illustrates an exemplary embodiment of the present invention for attachment as a band or bracelet 60M. The bracelet or band 60M may be used, for example, for production birds 80 or wildlife research, where the bracelet or band 60M is placed around the leg 916 of a bird 80. The bracelet or band 60M may include an RFID tag 200 and/or NFC tag 300 as will be described below in connection with FIGS. 10A-D. The bracelet or band 60M may be made of a plastic material or a rubber material.

Figure 10A:
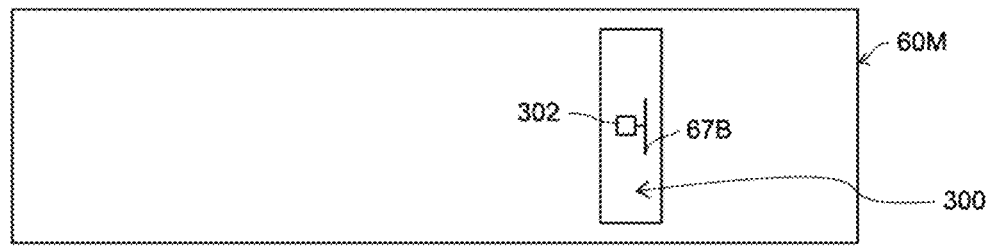
FIG. 10A illustrates an exemplary embodiment of an NFC tag in a band or bracelet.

Referring now to FIG. 10A, this figure illustrates an exemplary embodiment of an NFC tag 300 in a band or bracelet 60M. A band 60M (shown opened and in an un-rolled/un-furled state prior to applying it to a bird leg 80) may include an NFC tag 300 alone. The NFC tag 300 includes an NFC chip 302 and an antenna 67B appropriate for transmitting and receiving in frequencies used for NFC devices, similar to those described above.

Figure 10B:
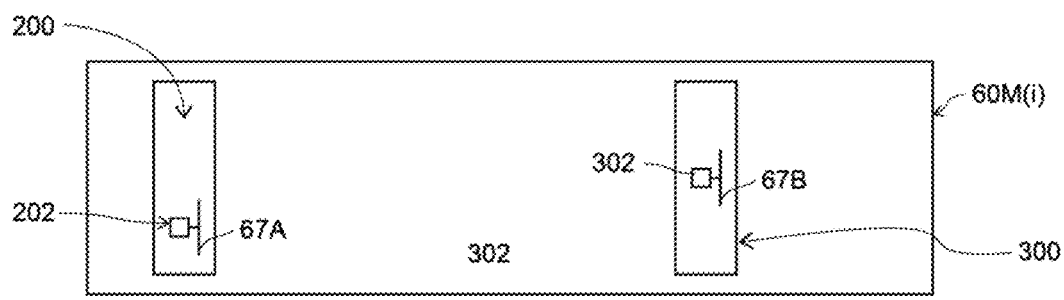
FIG. 10B illustrates an exemplary embodiment of an NFC tag and an RFID tag in a band or bracelet.

Referring now to FIG. 10B, this figure illustrates an exemplary embodiment of an NFC tag 300 and an RFID tag 200 in a band or bracelet 60M(i). The bracelet or a band 60M(i) may include an RFID tag 200 and an NFC tag 300 positioned adjacent to each other on the band 60M(i). As illustrated in FIG. 10B, the RFID tag 200 and NFC tag 300 may be separated on the bracelet and may have different circuit substrates [see rectangular structures], which may have the advantage reducing any potential RF interference. Alternatively, and not shown, the RFID tag 200 and the NFC tag 300 may be adjacent one another on the same bracelet/band 60M.

Figure 10C:
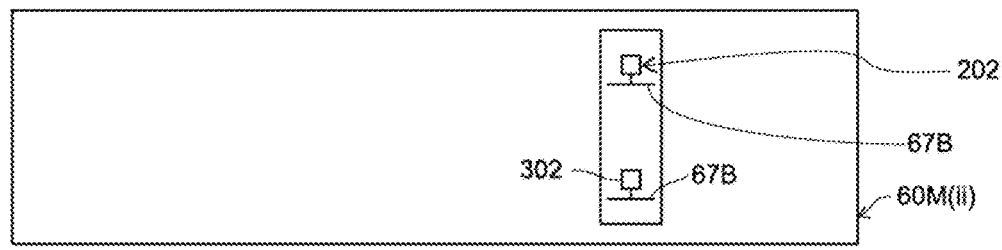
FIG. 10C illustrates another exemplary embodiment of an NFC tag and an RFID tag in a band or bracelet where the NFC tag and RFID tag share a single substrate.

Referring now to FIG. 10C, this figure illustrates another exemplary embodiment of an NFC tag 300 and an RFID tag 200 in a band or bracelet 60M(ii) where the NFC tag 300 and RFID tag 200 share a single substrate [see representative rectangular structure]. As illustrated in FIG. 10C, this single device may include an RFID chip 202 and appropriate first antenna 67A and an NFC chip 302 and appropriate second antenna 67B. The RFID tag 200 and the NFC tag 300 may be internal to the tag (i.e., inside the material that comprises the band/bracelet 60M(ii)) or externally attached, affixed or mounted on the band. The devices may be on the band 60M(ii) so that the RFID device 200 and NFC device 300 are adjacent the leg 80 on which it is located or so that the RFID and NFC devices 200, 300 may be positioned on opposite surfaces of the band 60M(ii) relative to the animal leg 80 on which the bracelet/band 60M(ii) is located.

Figure 10D:
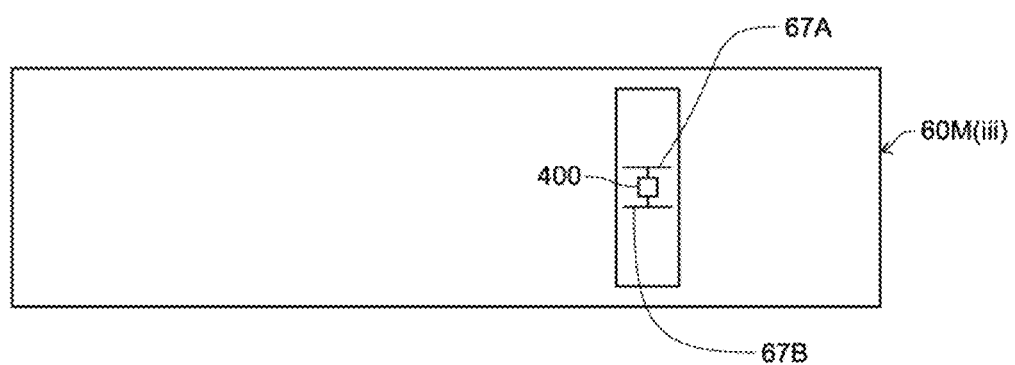
FIG. 10D illustrates another exemplary embodiment of an NFC tag and an RFID tag in a band or bracelet where the NFC tag and RFID tag share the same electronic chip for their respective tuning circuitry.

Referring now to FIG. 10D, this figure illustrates another exemplary embodiment of an NFC tag 300 and an RFID tag 200 in a band or bracelet 60M(iii) where the NFC tag 300 and RFID tag 200 share the same electronic chip 400 for their respective tuning circuitry.

Figure 11:
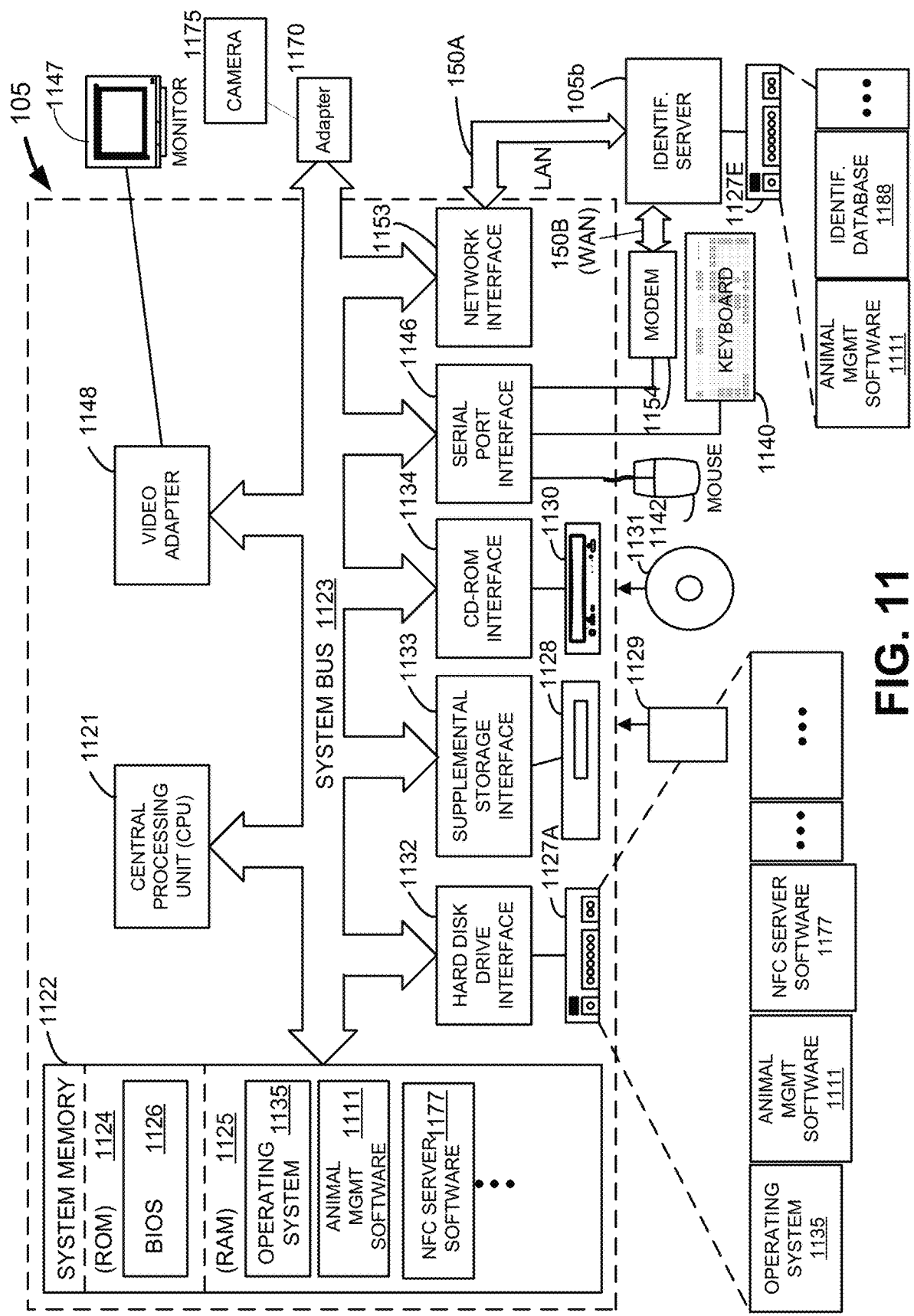
FIG. 11 is a functional block diagram of a general purpose computer that may form one or more of the computer servers as illustrated in FIG. 1 according to one exemplary embodiment.

Referring now to FIG. 11, this figure is a functional block diagram of internet connected device, for example, a computer server 105, and that can be used in the system 100 for tracking NFC tags 300. The exemplary operating environment for the system 100 includes a general-purpose computing device in the form of a conventional computer 150.

Generally, a computer 150 (which may form the servers 105a, 105b in system 100 of FIG. 1) includes a processing unit 1121, a system memory 1122, and a system bus 1123 that couples various system components including the system memory 1122 to the processing unit 1121.

The system bus 1123 may be any of several types of bus structures including a memory bus or memory controller, a peripheral bus, and a local bus using any of a variety of bus architectures. The system memory includes a read-only memory (ROM) 1124 and a random access memory (RAM) 1125. A basic input/output system (BIOS) 1126, containing the basic routines that help to transfer information between elements within computer 105, such as during start-up, is stored in ROM 1124.

The computer 105 can include a hard disk drive 1127A for reading from and writing to a hard disk, not shown, a supplemental storage drive for reading from or writing to a removable supplemental storage 1129 (like flash memory and/or a USB drive) and an optical disk drive 1130 for reading from or writing to a removable optical disk 11311 such as a CD-ROM or other optical media. Hard disk drive 1127A, magnetic disk drive 1128, and optical disk drive 1130 are connected to system bus 1123 by a hard disk drive interface 1132, a supplemental storage drive interface 1133, and an optical disk drive interface 1134, respectively.

Although the exemplary environment described herein employs hard disk 1127A, removable magnetic disk 1129, and removable optical disk 11311, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet connected devices such as in the servers 105 and mobile phone 110 of system 100.

The drives and their associated computer readable media illustrated in FIG. 11 provide nonvolatile storage of computer-executable instructions, data structures, program modules, and other data for computer or client device 100A. A number of program modules may be stored on hard disk 1127, magnetic disk 1129, optical disk 11311, ROM 1124, or RAM 1125, including, but not limited to, an operating system 1135 and animal management software 111, and NFC server software 1177. Program modules include routines, sub-routines, programs, objects, components, data structures, etc., which perform particular tasks or implement particular abstract data types. Aspects of the present invention may be implemented in the form of a downloadable, client-side, animal management software 111 which is executed by the phone 110 to provide a NFC reader described above.

A user may enter commands and information into computer 105 through input devices, such as a keyboard 1140 and a pointing device 1142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 1121 through a serial port interface 1146 that is coupled to the system bus 1123, but may be connected by other interfaces, such as a parallel port, game port, a universal serial bus (USB), or the like.

The display 1147 may also be connected to system bus 1123 via an interface, such as a video adapter 1148. As noted above, the display 1147 can comprise any type of display devices such as a liquid crystal display (LCD), a plasma display, an organic light-emitting diode (OLED) display, and a cathode ray tube (CRT) display.

The camera 1175 may also be connected to system bus 1123 via an interface, such as an adapter 1170. As noted previously, the camera 1175 can comprise a video camera such as a webcam. The camera 1175 can be a CCD (charge-coupled device) camera or a CMOS (complementary metal-oxide-semiconductor) camera. In addition to the monitor 1147 and camera 1175, the identification server 105b, comprising a computer, may include other peripheral output devices (not shown), such as speakers and printers.

The computer 105 may operate in a networked environment using logical connections to one or more remote computers, such as the identification server 105b of FIG. 11. A remote computer may be another personal computer, a server 105b, a mobile phone 110, a router, a network PC, a peer device, or other common network node. While a server or a remote computer 105b typically includes many or all of the elements described above, only a memory storage device 1127E has been illustrated FIG. 11 for the identification server 105b.

The logical connections depicted in the Figure include a local area network (LAN) 150A and a wide area network (WAN) 150B. Such networking environments are commonplace in offices, enterprise-wide computer networks, intranets, and the Internet.

When used in a LAN networking environment 150A, the computer 105 is often connected to the local area network 150A through a network interface or adapter 1153. When used in a WAN networking environment, the computer 105 typically includes a modem 1154 or other means for establishing communications over WAN 150B, such as the Internet. Modem 1154, which may be internal or external, is connected to system bus 1123 via serial port interface 1146. In a networked environment, program modules depicted relative to the server 4C, or portions thereof, may be stored in the remote memory storage device 1127E. It will be appreciated that the network connections shown are exemplary and other means of establishing a communications link between the computers 105 and mobile phones 110 of FIG. 1 may be used.

Moreover, those skilled in the art will appreciate that the present invention may be implemented in other computer system configurations, including hand-held devices—like mobile phone 110 of FIG. 1, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures and/or text which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

The NFC tags 300 described herein are not limited and may be adapted according to the principles of the present invention for all types of animals 80, including, but not limited to, dogs, fox, cats, ferrets, raccoons, wildcats, calves, cows, piglets, sheep, pigs, hogs, boars, horses, oxen, zebras, camels, dromedaries, lamas, ostriches, deer, elks, moose, monkeys, chicken, hens, turkeys, geese, and various species of birds; tuna, dolphins, sharks, and various species of fish; lions, panthers, puma, etc.

There are various types of NFC tags 300, and the NFC tag 300 for use in the present system can be selected from the various types of NFC tags to suit the system and information and usage according to the system. For example, static, "write once" types of tags may be used if the system is intended to be used for locked tags that are coded with information, such as the URL, in which the pet owner/user will not have write access to the NFC tag.

Re-writable NFC tags 300 may be used if the system architecture intends to allow the pet owner/user to write information, such as contact information, directly to the tag. The size and material of the NFC tag 300 may be such that it is suitable for various usages, including, for example, subcutaneous implantation, external affixing to a plastic collar or encasement in plastic.

Tag Encoding

According to an aspect of the present invention, upon acquisition of an NFC tag 300 according to the present invention, a user (such as a veterinarian, farmer, pet owner or the like) will use an NFC reader (e.g., within a "smart" mobile telephone 100 or a computer tablet 105) to access the NFC tag 300. The NFC tag 300 may provide a URL address that has been preloaded to the NFC tag memory 440. When the portable electronic device 100 has Internet connectivity, data can be exchanged between the NFC tag 300, the NFC reader [within a portable computing device, i.e. —a mobile phone 100] and online services, which allows for the transfer of data such as text or numbers between two NFC enabled devices 300.

An application ("App") installed on the portable computing device (PCD) 100 may launch for reading or in response to reading the NFC tag 300. In the present description, in place of interacting with a website, a user or third party could interact with the "App." The App may be customized. For example, the "app" may be set to launch in lieu of direction to the URL or the user may be provided the option of launching the App instead of being directed to the URL.

When a tag 300 that has never been read by NFC reader [within PCD 100] before is energized and read by the Internet connected NFC tag reader, the PCD 100 hosting the NFC tag reader and app launches the associated URL on an internet browser or via an appropriate application. The URL will include an interface to an Identification Server 105a [See FIG. 1] that hosts information related to the NFC tag 300, the user, and the hosting device 60 (e.g., animal tag, band, collar, etc.).

Upon first contact with the NFC tag 300, the URL will provide an information entry screen. At that time, the user may be prompted to create an account or to input information such as name, address, phone number, veterinarian information, other contact information or other animal identification information without setting up an account.

A pre-encoded URL and modern NFC chip function allow for a unique "Chip ID" to be appended at the end of the URL. Reading of the NFC chip will direct the user to a server page for the Identification Server and passes the unique ID to the server, which allows the server behavior and services provided via the server to be customized to that Chip ID. The benefit is that the user experience does not require any pre-installed App or service. Any NFC phone will initiate the web-browser experience customized for this particular "Chip ID", which creates an apparently 'seamless' experience.

Alternatively, if an App is launched and running on the PCD 100 prior to interact with the NFC tag 300, the App on the PCD 100 will become the main interaction with the chip 302 of the NFC tag 300 and will enable more advanced experience than the 'web-only'. The hosting device 60, e.g., collar, may include visible information thereon or therein. For example, an optical code (such as a Quick Read ("QR") code, Datamatrix 2D barcode or other 2D barcode, or bar code) or alpha-numeric or other information that can be linked to the animal or the registration or the Chip ID, or information to allow uncoded or limited access to the system's server 105b. The information on the hosting device 60 may be provided in a manner appropriate for the hosting device, including printing, engraving, embossing, inscription, etc. Alternate information allows for information/registration to be linked to the animal uniquely, which may be accessible via encoded access.

If an account is set up on the application server 105b, then the user can then to input information such as name, address, phone number, veterinarian information, other contact information or other animal identification information, such as description or medial needs. For example, the user or veterinarian can add allergy information, vaccination records and expiration dates, and treatment records, or the like. The user of PCD 100 may set up a password or PIN associated with the information or account. In some instances, the contact information may not need to be entered until a trigger event, such as if a pet is lost.

One advantage of embedding the NFC tag 300 in the pet collar or external device 60 is that the third party finding the pet will easily be able to identify that the pet is affiliated with an NFC tag. That is, there can be included an indication on the collar or external device that there is an NFC tag embedded therein, optionally including instructions for reading the NFC tag.

In one exemplary embodiment of the present invention, the NFC tag 300 may be affixed to, enclosed in or embedded in the material of the pet collar 60 or other external device 60 for a pet 80, in particular a cat or dog. It is contemplated that the NFC tag 300 may be included in an exemplary collar 60 made of a matrix in which is incorporated a substance which is active against ectoparasites such as fleas and ticks. This collar 60 or other external device 60 may be designed to ensure long term efficacy against fleas and ticks. An exemplary collar 60 is described at U.S. Pat. No. 6,083,519, which is hereby incorporated by reference for all purposes as if fully set forth herein and which incorporates between 5 and 40% active substance and is capable of releasing it over time.

Exemplary activities that may be used in a collar 60 of the present invention include, but are not limited to the disclosure of U.S. Pat. No. 9,000,187, e.g., flumethrin, imidacloprid, S-methoprene and others (incorporated by reference). U.S. Pat. No. 9,000,187 is hereby incorporated by reference for all purposes as if fully set forth herein and which describes imidacloprid used in such collars 60. It is further contemplated that flumethrin may also be included in an antiparasitic collar 60 without deviating from principles of the present invention. These collars 60 thus theoretically have the aim of ensuring long-lasting protection. Information stored in the NFC tag 300 may also include information related to the collar, including lot number, manufacturing date, pharmaceutical compound, pharmaceutical compound lot number, expiration date, end of efficacy date, etc. The system may also be used in conjunction with a GPS receiver for locating missing pets or lost people, may be paired with an activity tracker or the like.

The device including the NFC microchip 302 might also be a pendant or bracelet, ear tag, or other suitable device and may be adapted to other uses, such as providing information for children, the elderly or persons with special needs or disability. Analogous functionality may be provided in the back end systems such as identifying the wearer, medical needs, alerts, or the like. Functionality afforded by principles of the present invention allow for third party application development using the NFC tag information and platform.

Certain steps in the exemplary methods described herein naturally precede others for the invention to function as described. However, the invention is not limited to the order of the steps described if such order or sequence does not alter the functionality of the system and method of the present disclosure. That is, it is recognized that some steps may be performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Alternative embodiments for the system and methods of the present disclosure will become apparent to one of ordinary skill in the art to which the invention pertains without departing from its spirit and scope. While various specific embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. An electronic tag comprising:
   an encasement defining a volume, the encasement preventing liquids from entering the volume;
   a substrate having a predefined thickness and provided within the volume;
   a first chip positioned on the substrate, the first chip being assigned a first identifier which is unique to the first chip;
   a first antenna coupled to the first chip and positioned on the substrate, the first chip and first antenna providing near-field communications (NFC) and transmitting the first identifier when the first antenna is interrogated;
   a second chip positioned on the substrate, the second chip being assigned a second identifier, the second identifier being different than the first identifier; and
   a second antenna coupled to the second chip and positioned on the substrate, the second chip and second antenna providing radio-frequency identifier (RFID) communications and transmitting the second identifier using the RFID communications.

2. The electronic tag of claim 1, wherein the encasement comprises at least one of: glass, plastic, and a biocompatible polymer.

3. The electronic tag of claim 1, wherein the encasement is at least one of implantable within a skin of an animal and ingestible by an animal.

4. The electronic tag of claim 1, wherein the first chip communicates information using NFC at a radio-frequency of about 14.0 MHz, and the second chip communicates information using RFID communications at a radio-frequency of about 134 kHz.

5. The electronic tag of claim 1, wherein the first chip stores a permanent universal resource locater (URL) address.

6. The electronic tag of claim 5, wherein the first chip transmits both the first identifier and the permanent URL address when interrogated by RF signals received from the first antenna.

7. The electronic tag of claim 1, wherein the first chip comprises a power harvester for converting radio-frequency (RF) signals received from the first antenna into power for powering the first chip so that the first chip may send and receive NFC signals.

8. The electronic tag of claim 1, wherein first chip further stores at least one of: a lot number, manufacturing date, a pharmaceutical compound, a pharmaceutical compound lot number, an expiration date, and an end of efficacy date; a configuration parameter, a pre-programmed cryptographic key, a vaccination certificate, vaccination information; a medical condition; allergy information; rabies vaccination status; and a telephone number.

9. The electronic tag of claim 3, wherein the animal comprises a companion animal.

10. The electronic tag of claim 9, wherein the companion animal comprises at least one of: a cat, a dog or a horse.

11. An electronic tag comprising:
   an encasement defining a volume, the encasement preventing liquids from entering the volume;
   a substrate having a predefined thickness and provided within the volume;
   a chip positioned on the substrate, the chip comprising a first circuit and a second circuit, the first circuit being assigned a first identifier which is unique to the first chip;
   a first antenna coupled to the first circuit and positioned on the substrate, the first circuit and first antenna providing near-field communications (NFC) and transmitting a first identifier when the first antenna is interrogated;
   the second circuit being assigned a second identifier, the second identifier being different than the first identifier; and
   a second antenna coupled to the second circuit and positioned on the substrate, the second circuit and second antenna providing radio-frequency identifier (RFID) communications and transmitting the second identifier using the RFID communications.

12. The electronic tag of claim 11, wherein the encasement comprises at least one of: glass, plastic, and a biocompatible polymer.

13. The electronic tag of claim 11, wherein the encasement is at least one of implantable within a skin of an animal and ingestible by an animal.

14. The electronic tag of claim 11, wherein the first circuit communicates information using NFC at a radio-frequency of about 14.0 MHz, and the second circuit communicates information using RFID communications at a radio-frequency of about 134 kHz.

15. The electronic tag of claim 11, wherein the first circuit stores a permanent universal resource locater (URL) address.

16. The electronic tag of claim 15, wherein the first circuit transmits both the first identifier and the permanent URL address when interrogated by RF signals received from the first antenna.

17. The electronic tag of claim 11, wherein the first circuit comprises a power harvester for converting radio-frequency (RF) signals received from the first antenna into power for powering the first circuit so that the first circuit may send and receive NFC signals.

18. The electronic tag of claim 11, wherein first circuit further stores at least one of: a lot number, manufacturing date, a pharmaceutical compound, a pharmaceutical compound lot number, an expiration date, and an end of efficacy date; a configuration parameter, a pre-programmed cryptographic key, a vaccination certificate, vaccination information; a medical condition; allergy information; rabies vaccination status; and a telephone number.

19. The electronic tag of claim 13, wherein the animal comprises a companion animal.

20. The electronic tag of claim 19, wherein the production animal comprises at least one of: a cat, a dog or a horse.

* * * * *